United States Patent
Morino

(10) Patent No.: US 7,903,179 B2
(45) Date of Patent: Mar. 8, 2011

(54) MOTION DETECTION DEVICE AND NOISE REDUCTION DEVICE USING THAT

(75) Inventor: Hideki Morino, Osaka (JP)

(73) Assignee: Panasonic Corporation, Osaka (JP)

( * ) Notice: Subject to any disclaimer, the term of this patent is extended or adjusted under 35 U.S.C. 154(b) by 1914 days.

(21) Appl. No.: 10/510,872

(22) PCT Filed: Jun. 24, 2003

(86) PCT No.: PCT/JP03/07980
§ 371 (c)(1),
(2), (4) Date: Oct. 8, 2004

(87) PCT Pub. No.: WO04/002135
PCT Pub. Date: Dec. 31, 2003

(65) Prior Publication Data
US 2005/0168651 A1 Aug. 4, 2005

(30) Foreign Application Priority Data

Jun. 25, 2002 (JP) .................. 2002-183891
Feb. 10, 2003 (JP) .................. 2003-032138

(51) Int. Cl.
*H04N 5/14* (2006.01)
*H04N 7/12* (2006.01)
(52) U.S. Cl. .................... 348/701; 375/240.16
(58) Field of Classification Search .................. 348/701; 375/240.01–240.06, 240.12–240.16, 240.26
See application file for complete search history.

(56) References Cited

U.S. PATENT DOCUMENTS

| 4,090,221 A | * | 5/1978 | Connor .................... 348/620 |
| 4,240,106 A | | 12/1980 | Michael et al. |
| 4,240,109 A | | 12/1980 | Michael et al. |
| 4,485,403 A | | 11/1984 | Illetschko et al. |
| 4,661,853 A | | 4/1987 | Roeder et al. |
| 4,851,904 A | * | 7/1989 | Miyazaki et al. .......... 348/700 |
| 4,933,757 A | * | 6/1990 | Kanno et al. ................ 348/71 |
| 4,979,040 A | * | 12/1990 | Masumoto ............. 375/240.21 |

(Continued)

FOREIGN PATENT DOCUMENTS

DE     196 36 952 A1     3/1998

(Continued)

OTHER PUBLICATIONS

Supplementary European Search Report for EP 03 73 8508, dated Jan. 30, 2008.

(Continued)

*Primary Examiner* — David Czekaj
(74) *Attorney, Agent, or Firm* — RatnerPrestia

(57) ABSTRACT

The invention provides a motion detection apparatus that can improve a noise removal effect, can suppress the occurrence of tailing of a motion portion resulting from the increase of the noise removal effect, can increase the noise removal effect from a high electric field to a low electric field and can eliminate unnaturalness of the image for observation such as an after-image and a pasting feel resulting from the increase of the noise removal effect, and a noise reduction apparatus using the motion detection apparatus. The motion detection apparatus compares a frame difference with a threshold value, calculates the sum of the comparison result for a block including a plurality of pixels, and applies in expansion the output to several pixels in a horizontal or vertical direction to detect motion. The noise reduction apparatus utilizes this motion detection apparatus.

21 Claims, 17 Drawing Sheets

U.S. PATENT DOCUMENTS

| | | | |
|---|---|---|---|
| 5,386,249 A * | 1/1995 | Strolle et al. | 348/701 |
| 5,442,407 A | 8/1995 | Iu | |
| 5,912,707 A * | 6/1999 | Kim | 375/240.16 |
| 6,037,988 A * | 3/2000 | Gu et al. | 375/240.16 |
| 6,061,100 A | 5/2000 | Ward et al. | |
| 6,501,794 B1 * | 12/2002 | Wang et al. | 375/240.08 |

FOREIGN PATENT DOCUMENTS

| | | |
|---|---|---|
| EP | 0 333 069 A2 | 3/1989 |
| EP | 1 137 268 A1 | 9/2001 |
| JP | 3-117274 | 5/1991 |
| JP | 5-30391 | 2/1993 |
| JP | 6-350881 | 12/1994 |
| JP | 2000-115585 | 4/2000 |
| JP | 2001-160909 | 6/2001 |
| JP | 2002-94834 | 3/2002 |

OTHER PUBLICATIONS

International Search Report corresponding to application No. PCT/JP03/07980 dated Aug. 12, 2003.

Matsui, Shunya, "Transistor Technology SPECIAL No. 52", CQ Publication Co., pp. 89-92, Oct. 1, 1995. (partial English translation provided).

* cited by examiner

FIG. 11A

| G1 | G2 | G1 | G2 | G1 | G2 | G1 | G2 |
|----|----|----|----|----|----|----|----|
| G2 | G1 | G2 | G1 | G2 | G1 | G2 | G1 |
| G1 | G2 | G1 | G2 | G1 | G2 | G1 | G2 |
| G2 | G1 | G2 | G1 | G2 | G1 | G2 | G1 |
| G1 | G2 | G1 | G2 | G1 | G2 | G1 | G2 |
| G2 | G1 | G2 | G1 | G2 | G1 | G2 | G1 |

G1: First gain
G2: Second gain

| G2 | G1 | G2 | G1 | G2 | G1 | G2 | G1 |
|----|----|----|----|----|----|----|----|
| G1 | G2 | G1 | G2 | G1 | G2 | G1 | G2 |
| G2 | G1 | G2 | G1 | G2 | G1 | G2 | G1 |
| G1 | G2 | G1 | G2 | G1 | G2 | G1 | G2 |
| G2 | G1 | G2 | G1 | G2 | G1 | G2 | G1 |
| G1 | G2 | G1 | G2 | G1 | G2 | G1 | G2 |

1102

MOTION DETECTION DEVICE AND NOISE REDUCTION DEVICE USING THAT

This application is a U.S. National Phase Application of PCT International Application PCT/JP2003/007980.

TECHNICAL FIELD

This invention relates to a video signal processing technology in television receivers.

BACKGROUND ART

Frame recursive type noise reduction is known as a method of removing noise from a video input signal containing the noise. For example, a known method calculates a difference between a signal obtained by frame-delaying a video output signal (from which the noise is removed) and a video input signal, multiplies the difference value by a desired recursive coefficient (from 0 to less than 1) and conducts addition/subtraction to and from the original video input signal to remove the noise.

Japanese Patent Laid Open No. 2002-94834 and "Transistor Technology SPECIAL" (by Shunya MATSUI, No. 52, 1999, CQ Publication Co., p 89-92) describe other known technologies for motion detection and noise reduction technologies.

An example of the prior art technologies will be hereinafter explained.

FIGS. 18A and 18B show an example of a frame recursive type noise reduction apparatus according to the prior art. Referring to FIG. 18A, a frame memory 1801 frame-delays a video output signal (from which noise is removed) 1807. A subtracter 1802 calculates a frame difference between an output of the frame memory 1801 and a video input signal 1806. This difference value is inputted to a motion detection/recursive coefficient generation circuit 1803 that executes motion detection and generation of a recursive coefficient. The motion detection/recursive coefficient generation circuit 1803 generates the recursive coefficient in accordance with the difference value.

FIG. 18B shows an example of the relation between the difference value and the recursive coefficient.

Referring to FIG. 18B, abscissa 1810 represents a difference value. Ordinate 1811 represents a recursive coefficient. Curve 1812 represents a relation between the difference value and the recursive coefficient. As represented by the curve 1812, the motion detection/recursive coefficient generation circuit 1803 has characteristics such that the recursive coefficient is non-linearly decreased as the difference value becomes great. This represents that motion detection is made by utilizing the correlation that the difference becomes great when the motion becomes great. A multiplier 1804 multiplies the recursive coefficient obtained in this way by the frame difference. An adder/subtracter 1805 further conducts addition/subtraction of the output of the multiplier 1804 to or from the video input signal 1806 in accordance with the sign of the frame difference and a video output signal 1807 from which the noise is removed can thus be obtained.

In the prior art system described above, the noise removal effect becomes great when the recursive coefficient is increased but a problem of tailing that results from the frame difference occurs in this case at a portion having motion. Therefore, a method is known that executes a non-linear processing in accordance with the frame difference value, or detects motion and changes the recursive coefficient in accordance with the detection result. However, since motion detection of the prior art utilizes as such the frame difference value or horizontal and vertical edge detection, the noise and the motion cannot be discriminated for the motion portions having a level substantially equal to or below the noise level. When the noise is removed under this state, the tailing phenomenon occurs. Consequently, under such a state, the noise removal effect is limited from the aspect of prevention of the tailing problem.

Another method executes the non-linear processing in accordance with the difference value, or detects motion and changes the recursive coefficient in accordance with the detection result. This method is described in the non-patent reference given above. However, motion detection according to the prior art utilizes as such the frame or field difference value. In this case, the noise and the motion cannot be discriminated for the motion portion having a level substantially equal to or below the noise level. Under such a state, therefore, the noise removal effect is limited from the aspect of prevention of an after-image.

In the construction described above, when the difference value resulting from the motion in the frame difference is substantially equal to or below the level of the difference value resulting from the noise, they cannot be discriminated and the recursive coefficient cannot be increased to prevent the occurrence of tailing. Therefore, the noise removal effect is limited.

To adaptively improve the noise removal effect for dark portions at which the noise amount is likely to become great, a method that controls the noise removing level by using information from an AGC circuit or the input signal level may be possible. To corporate with the AGC circuit, however, a new control circuit must be added. In the method using the input signal level itself, fluctuation of the control level is likely to occur in a spatial direction due to the influences of noise.

When recursive type noise reduction and non-recursive type noise reduction using a filter in the spatial direction are adaptively used in combination in accordance with the motion detection result, unnaturalness for observation is likely to occur with a discontinuous processing in the spatial direction if the discontinuous motion detection result of the prior art is used. Moreover, because a filter in the spatial direction is applied to a moving picture region containing a contour, obscurity of the contour is likely to occur in the a moving picture and a contour correction circuit must be added.

Generally, a still picture portion and a moving picture portion appear with certain coherence in the image. Therefore, the possibility is high that the same recursive coefficient is used among adjacent pixels in that region from the motion detection result. Particularly when the recursive coefficient is increased to a great value, unnaturalness for observation such as pasting feel of the image is likely to occur. Furthermore, a threshold value for the motion detection becomes great in a low electric field and when the recursive coefficient is increased, unnaturalness such as feeling of a film pasted on the entire screen is likely to occur.

DISCLOSURE OF THE INVENTION

A motion detection apparatus includes at least:
a frame memory for frame-delaying a video input signal;
a subtracter for calculating a difference between the video input signal and a frame delay signal read out from the frame memory;
a comparison portion for comparing an output of the subtracter with an arbitrary threshold value;

a first line memory for delaying a signal outputted from the comparison portion;

a second line memory for further delaying the signal of the first line memory; and a block discrimination portion for calculating a sum of pixels inside a block constituted by each pixel of a video signal as a center and a plurality of pixels adjacent to the center pixel in both horizontal and vertical directions, for the output from the comparison portion, the output from the first line memory and the output from the second line memory, and comparing the sum with an arbitrary threshold value.

A noise reduction apparatus includes at least:

the motion detection apparatus described above;

a noise reduction processing portion for removing noise by multiplying the output of the subtracter by a coefficient and conducting addition/subtraction to and from the video input signal;

a third line memory for delaying the output from the noise reduction processing portion by a line delay amount of the comparison portion and the peculiar point removal portion;

a fourth line memory for delaying the video input signal by a line delay amount of the comparison portion and the peculiar point removal portion; and a selector for selecting the output of the third line memory and the output of the fourth line memory in accordance with the motion detection result and outputting a video output signal;

wherein the video output signal selected by the selector is inputted to the frame memory.

BRIEF DESCRIPTION OF THE DRAWINGS

FIGS. 11A and 11B are explanatory views of gain control in Embodiment 7 of the invention.

DETAILED DESCRIPTION OF THE PREFERRED EMBODIMENTS

The invention provides a motion detection apparatus and a noise reduction apparatus solving the problems of known motion detection apparatuses and noise reduction apparatuses.

Embodiments of the invention will be hereinafter explained with reference to the drawings.

Embodiment 1

First, (Embodiment 1) of the invention will be explained in detail.

Figure 1:
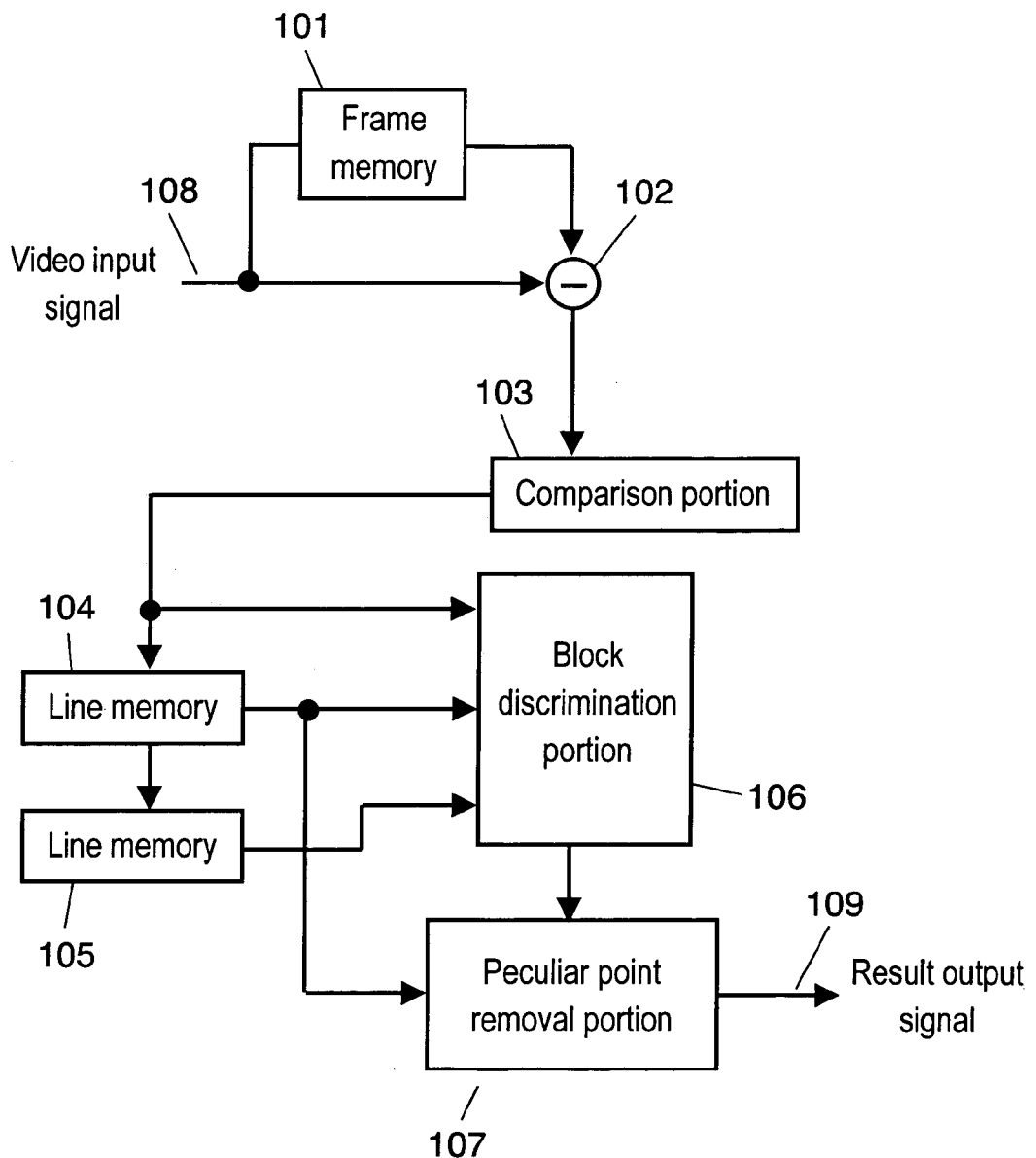
FIG. 1 shows a motion detection apparatus using block discrimination in Embodiment 1 of the invention.

FIG. 1 shows a structural view of a motion detection apparatus in (Embodiment 1) of the invention.

A frame memory 101 frame-delays a video input signal 108 and a subtracter 102 calculates a difference between a video input signal 108 and a frame delay signal read out from the frame memory 110. A comparison portion 103 compares the output from the subtracter 102 with a predetermined threshold value and generates a desired signal in accordance with the comparison result. A first line memory (described as line memory in FIG. 1) 104 delays by one line (one horizontal scan period) the signal outputted from the comparison portion 103. A second line memory (described as line memory in FIG. 1) 105 further delays by one line the output of the first line memory 104. A block discrimination portion 106 calculates the sum of pixels inside a block, compares the sum with a predetermined threshold value and outputs a desired signal as a value of a center pixel of the block in accordance with the comparison result. This block is constituted by each pixel as the center and several pixels in the proximity of the center pixel in both horizontal and vertical directions. The pixels constituting the block are acquired from the comparison portion 103, the first line memory 104 and the second line memory 105. A peculiar point removal portion 107 removes peculiar points occurring in a series of processing in the block discrimination portion 106, etc, and outputs a motion detection result. The processing for removing the peculiar points in the peculiar point removal portion 107 is executed by applying in escalation by several pixels the result of the block discrimination portion 106 in the horizontal or vertical direction or in a direction of a time axis, or by comparing the signal before the processing in the block discrimination portion 106 in each pixel.

The operation will be explained with reference to a concrete example.

The subtracter 102 calculates the difference between a signal obtained by delaying by one frame the video input signal 108 in the frame memory 101 and the video input signal 108 and inputs this frame difference to the comparison portion 103. The comparison portion 103 compares the level of the frame difference with that of a predetermined threshold value and outputs a desired signal in accordance with the comparison result. The comparison portion 103 acquires an absolute value of the frame difference, compares it with the threshold value and outputs a one-bit signal of 0 when the absolute value of the difference value is smaller than the threshold value and a one-bit signal of 1 when the absolute value is not smaller than the threshold value.

Figure 4A:
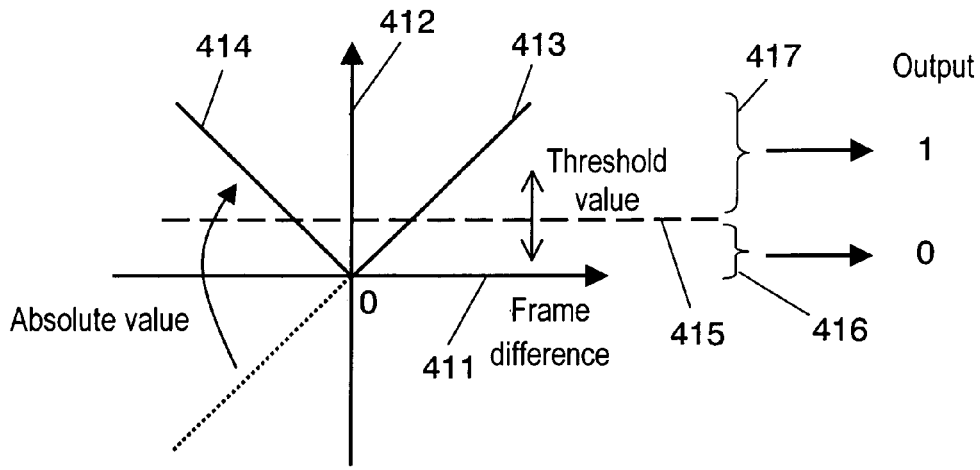
FIGS. 4A to 4C are explanatory views of motion detection by block discrimination.

FIG. 4A shows an example of characteristics of the comparison portion 103. In FIG. 4A, abscissa 411 represents the frame difference described above and ordinate 412 represents the absolute value of the frame difference. Lines 413 and 414 represent the relation between the frame difference and the absolute value of the frame difference. The frame difference and the absolute value of the frame difference are divided into regions 416 and 417 with the threshold value 415 as a boundary. The comparison portion 103 outputs 0 in the region 416 and 1 in the region 417.

Noise can be eliminated to a certain extent at this time by applying low-pass filter processing, or the like, to the frame difference signal. This one-bit signal, the signal obtained by delaying by one line this signal in the first line memory 104 and the signal obtained by delaying further by one line the output signal of the first line memory 104 in the second line memory 105 are inputted to the block discrimination portion 106.

Figure 4B:
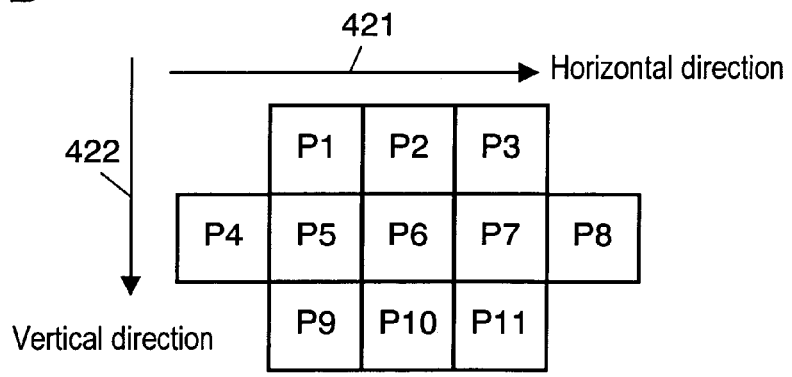

The operation of the block discrimination portion 106 will be explained with reference to FIGS. 4B and 4C. Referring to FIG. 4B, arrow 421 represents the horizontal direction of a screen and arrow 422 does the vertical direction of the screen. Three pixels, five pixels and three pixels with a pixel P6 as a center, or eleven pixels in total, are processed as a block. The outputs of the comparison portion 103 at this time are a pixel P9, a pixel P10 and a pixel P11. The outputs of the first line memory 104 are a pixel P4, a pixel P5, a pixel P6, a pixel P7 and a pixel P8. The outputs of the second line memory 105 are a pixel P1, a pixel P2 and a pixel P3.

Figure 4C:
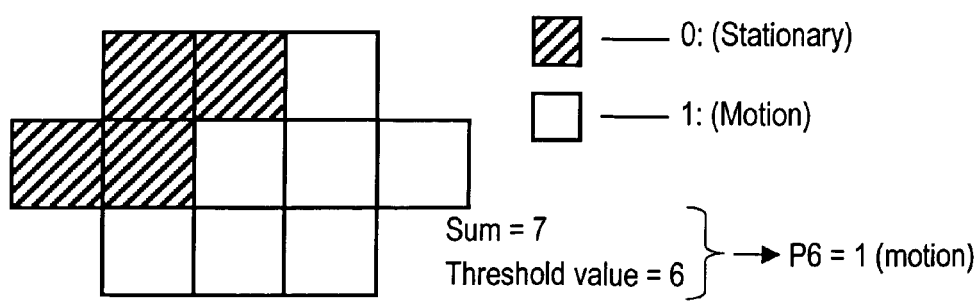

FIG. 4C shows the output of the comparison portion 103 for each pixel in FIG. 4B. The pixels indicated by oblique lines mean 0 and the pixels without the oblique lines mean 1. The block discrimination portion 106 calculates the sum of the one-bit signals (1 or 0) outputted from the line memory 104 and the line memory 105 of the comparison portion 103 for these eleven pixels and compares the sum with the predetermined threshold value. The minimum value of the sum is 0 and the maximum value is 11. The block discrimination portion 106 outputs one-bit signal having 0 as the value of the center pixel P6 when the sum is smaller than the threshold value and the one-bit signal having 1 when the sum is not smaller than the threshold value. Here, the pixels having the 1 value are regarded as the pixels having motion. Since the sum is 7 and the threshold value is 6 in FIG. 4C, the block discrimination portion judges that P6 is the motion portion and outputs 1. This processing utilizes the property that the motion portion of the image appears with certain coherence among a plurality of adjacent pixels and randomness that noise appears at random among the adjacent pixels. The block discrimination portion 106 makes such judgment by the block for each pixel and inputs the judgment result to the peculiar point removal portion 107.

Here, the case where the result of the block discrimination portion 106 is applied in escalation to several pixels in the horizontal or vertical direction and the case where the result is applied in escalation in the direction of the time axis will be described by way of example. The application of one pixel in escalation in the horizontal direction, for example, means that the pixels P5 and P7 in FIG. 4B, too, are regarded as the pixels having motion when the pixel P6 is 1 (motion). Because erroneous judgment (the portion that should be 1 is judged as 0) is likely to occur at the boundary between the motion portion and the still picture portion in the block judgment described above, the motion portion is expanded to correct this erroneous judgment. The signal the erroneous detection of which is corrected in this manner is outputted as the motion detection result output signal. When judgment using the block is employed, only the motion portion of the image can be detected while suppressing the influences of the noise contained in the input signal.

Embodiment 2

Next, (Embodiment 2) of the invention will be explained in detail.

Figure 2:
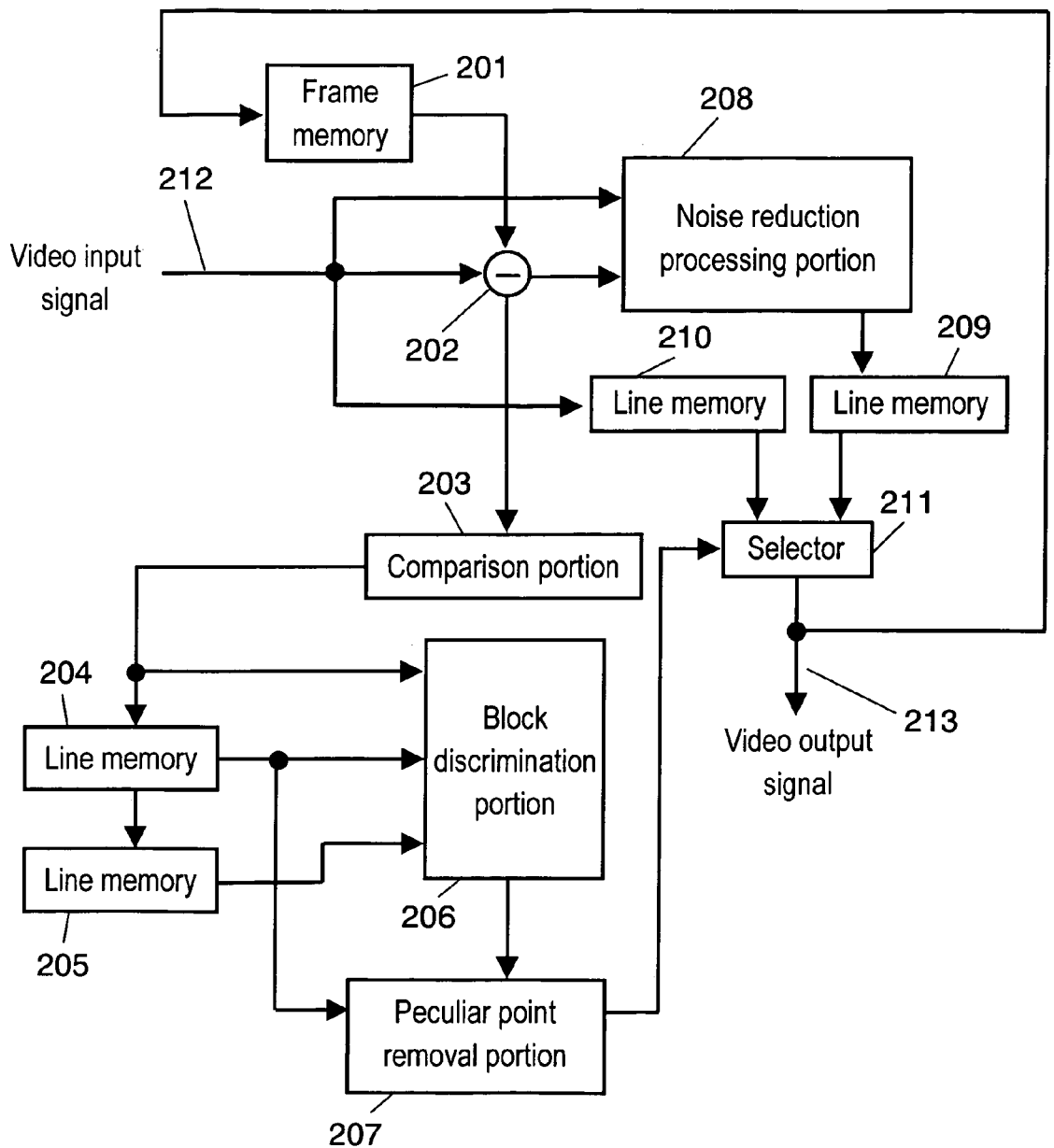
FIG. 2 shows a noise reduction apparatus in Embodiment 2 of the invention.

FIG. 2 shows a structural view of a noise reduction apparatus in (Embodiment 2) of the invention.

A frame memory 201, a subtracter 202, a comparison portion 203, a first line memory (described as line memory in FIG. 2) 204, a second line memory (described as line memory in FIG. 2) 205, a block discrimination portion 206 and a peculiar point removal portion 207 shown in FIG. 2 respectively have functions equivalent to those of the frame memory 101, the subtracter 102, the comparison portion 103, the first line memory 104, the second line memory 105, the block discrimination portion 106 and the peculiar point removal portion 107 shown in FIG. 1. Therefore, the detailed explanation of these members will be omitted. However, the frame memory 201 frame-delays a video output signal of this noise reduction apparatus.

A noise reduction processing portion 208 multiplies the output of the subtracter 202 by a predetermined coefficient and adds or subtracts the product to or from the video input signal 212 and removes the noise. A third line memory (described as line memory in FIG. 2) 209 delays the output from the noise reduction processing portion 208 by the line delay amount between the comparison portion 203 and the peculiar point removal portion 207. A fourth line memory (described as line memory in FIG. 2) 210 delays the video input signal 212 by the line delay amount between the comparison portion 203 and the peculiar point removal portion 207. A selector 211 selects the output from the noise reduction processing portion 208 delayed by the third line memory 209 and the video input signal 212 delayed by the fourth line memory 210 in accordance with the motion detection result from the peculiar point removal portion 207. The selector 211 outputs the selected signal as the video output signal 213.

The operation will be explained with reference to a concrete example.

The subtracter 202 calculates the frame difference between the video output signal 213 frame-delayed in the frame memory 201 and the video input signal 212. Motion detection is conducted by using this frame difference in the same way as in (Embodiment 1) described above. The peculiar point removal portion 207 outputs 1 for the motion portion and 0 for the still picture portion for each pixel as the motion detection result signal. On the other hand, the noise reduction processing portion 208 multiplies the output result (frame difference) of the subtracter 202 by a predetermined coefficient (0 to less than 1) in accordance with the difference and adds or subtracts the result to or from the video input signal 212 in accordance with the sign of the frame difference to remove the noise. The third line memory 209 delays the output from the noise reduction processing portion 208 by the line delay amount between the comparison portion 203 and the peculiar point removal portion 207. The fourth line memory 210 delays the video input signal 212 by the line delay amount between the comparison portion 203 and the peculiar point removal portion 207. In other words, block discrimination of three lines is made in this case as shown in FIG. 4B. Since the center pixel corresponds to 1-line delay signal in this case, the third and fourth line memories 209 and 210 execute 1-line delay. The selector 211 selects the output from the noise reduction processing portion 208 delayed by the third line memory 209 and the video input signal 212 delayed by the fourth line memory 210 in accordance with the motion detection result from the peculiar point removal portion 207. More concretely, the selector 211 selects the video input signal delayed by the fourth line memory 210 when the motion detection result is 1 (motion) and the signal from the noise reduction processing portion 208 delayed by the third line memory 209 when the motion detection result is 0 and outputs the selected signal as the video output signal 213. Since the motion detection apparatus shown in FIG. 1 can detect motion while suppressing the influences of the noise in this noise reduction apparatus, the noise reduction processing portion 208 can provide a greater noise removal effect than in the prior art and can also suppress the problem of tailing that results from the motion portion.

Embodiment 3

Next, (Embodiment 3) of the invention will be explained in detail.

Figure 3:
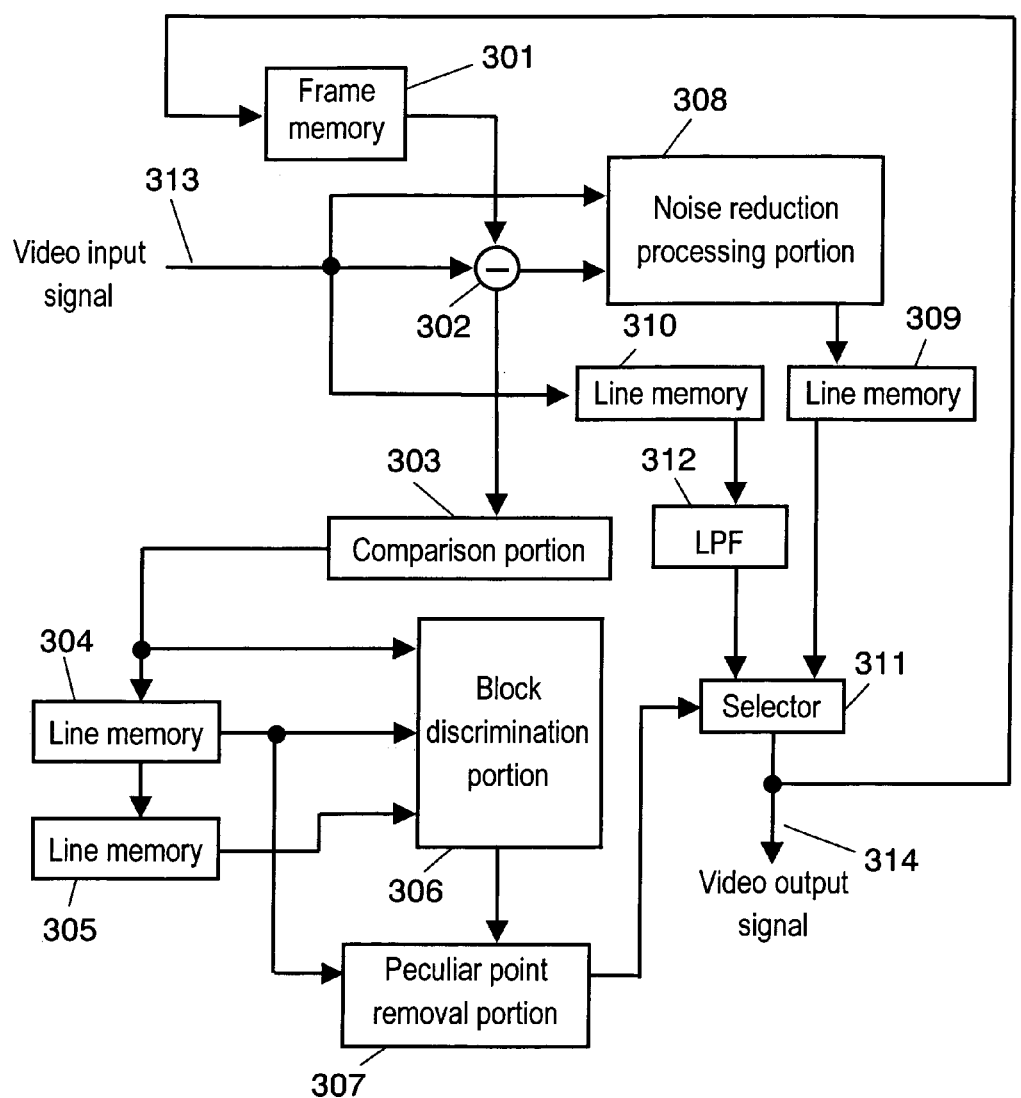
FIG. 3 shows a noise reduction apparatus in Embodiment 3 of the invention.

FIG. 3 shows a structural example of a noise reduction apparatus in (Embodiment 3) of the invention.

A frame memory 301, a subtracter 302, a comparison portion 303, a first line memory (described as line memory in FIG. 3) 304, a second line memory (described as line memory in FIG. 3) 305, a block discrimination portion 306, a peculiar point removal portion 307, a noise reduction processing portion 308, a third line memory (described as line memory in FIG. 3) 309, a fourth line memory (described as line memory in FIG. 3) 310 and a selector 311 shown in FIG. 3 respectively have functions equivalent to those of the frame memory 201, the subtracter 202, the comparison portion 203, the first line memory 204, the second line memory 205, the block discrimination portion 206, the peculiar point removal portion 207, the noise reduction processing portion 208, the third line memory 209, the fourth line memory 210 and the selector 211 shown in FIG. 2. Therefore, detailed explanation of these members will be omitted. A filter 312 (described as LPF in FIG. 3) reduces noise components by applying a low-pass filter processing to the video input signal 313 containing the noise. In the noise reduction apparatus described in FIG. 2, unnaturalness for observation is likely to occur due to the difference of the noise amount between the portion at which the video input signal 212 detected as the motion portion and containing large amounts of noise is as such outputted and the portion at which the noise is removed by the noise reduction processing portion 208. In contrast, when the construction shown in FIG. 3 is employed, unnaturalness for observation resulting from the difference of the noise amount described above can be reduced.

Incidentally, when the noise amount is not much great, it is also possible to prevent the filter processing in order to avoid the drop of image quality resulting from the filter processing.

Embodiment 4

Next, (Embodiment 4) of the invention will be explained in detail.

Figure 5:
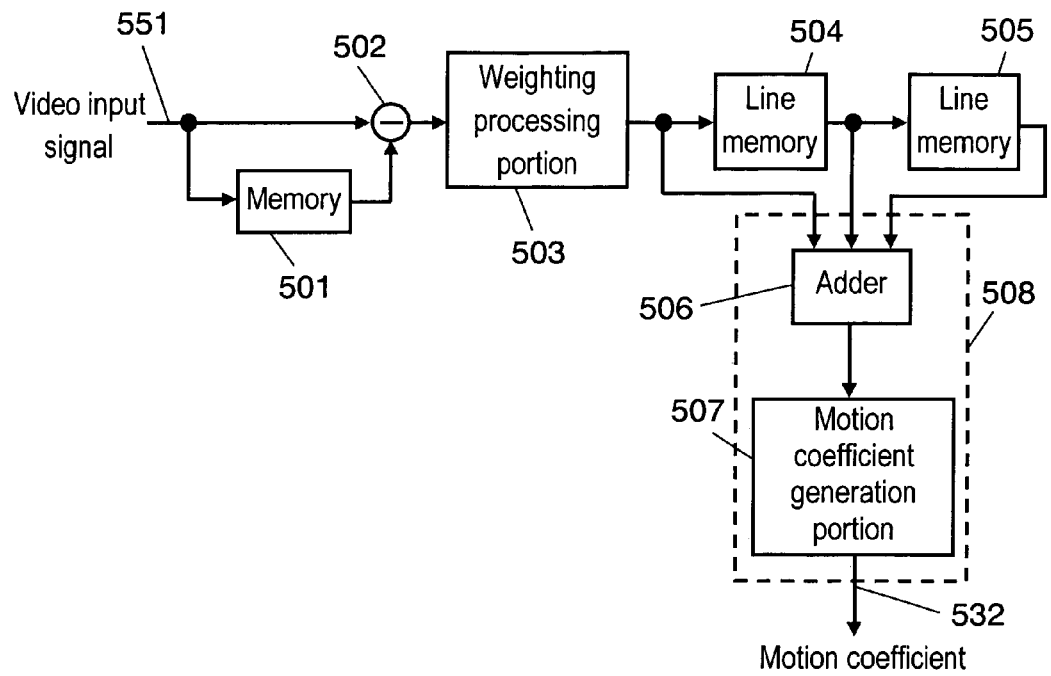
FIG. 5 shows a motion detection apparatus in Embodiment 4 of the invention.

FIG. 5 shows a structural view of a motion detection apparatus in (Embodiment 4) of the invention.

A video input signal 551, a subtracter 502, a first line memory (described as line memory in FIG. 5) 504, a second line memory (described as line memory in FIG. 5) 505 and a block discrimination portion 508 shown in FIG. 5 respectively correspond to the video input signal 108, the subtracter 102, the first line memory 104, the second line memory 105 and the block discrimination portion 106 shown in FIG. 1. Therefore, detailed explanation of these members will be omitted.

A memory 501 corresponds to the frame memory 101 shown in FIG. 1. A weighting processing portion 503 corresponds to the comparison portion 103 in FIG. 1. The weighting processing portion 503 has a greater number of threshold values than the comparison portion 103 and the number of output patterns is greater, too. In other words, the weighting processing portion 503 performs weighting of the output of the subtracter 502 in accordance with its value to a plurality of levels by using predetermined threshold values. A first adder (described as adder in FIG. 5) 506 and a motion coefficient generation portion 507 together constitute the block discrimination portion 508.

The first adder 506 handles a plurality of pixels adjacent to each pixel of the video signal as its center in the horizontal and vertical directions as one block and calculates the sum of each pixel inside the block for the output of the weighting processing portion 503, the output of the first line memory 504 and the output of the second line memory 505. The motion coefficient generation portion 507 generates a motion coefficient 532 for the center pixel of the block by using a non-linear continuous function in accordance with the addition result in the first adder 506 and outputs the motion coefficient 532.

Next, the operation will be explained with reference to a concrete example.

The weighting processing portion 503 applies the weight to the output of the subtracter 502 into a plurality of levels by a predetermined threshold value in accordance with the output value. An example where weighting is made into four levels will be hereby explained.

Figure 6A:
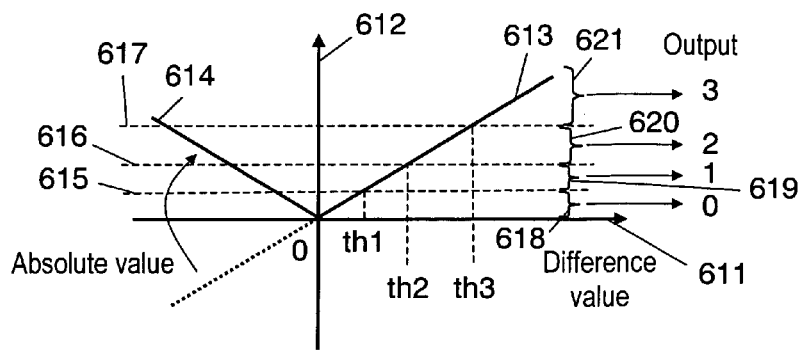
FIGS. 6A to 6E are explanatory views of motion detection in Embodiment 4 of the invention.

FIG. 6A shows an input/output relation of the weighting processing portion 503 for weighting into the four levels. In FIG. 6A, abscissa 611 represents the frame difference, ordinate 612 represents the absolute value of the frame difference and lines 613 and 614 represent the relation between the frame difference and the absolute value of the frame difference. The frame difference and the absolute value of the frame difference are divided into regions 618 and 619 and the regions 620 and 621 with the threshold values 615, 616 and 617 being the boundaries. The weighting processing portion 503 calculates the absolute value of the frame difference value and applies weighting into the four levels of from 0 to 3 by using three threshold values (th1, th2 and th3) in accordance with the absolute value. When the absolute value is smaller than th1, the absolute value corresponds to the region 618 and 0 is outputted. When the absolute value is from th1 to less than th2, it corresponds to the region 619 and 1 is outputted. When the absolute value is from th2 to less than th3, it corresponds to the region 620 and 2 is outputted. When the absolute value is not smaller than th3, it corresponds to the region 621 and 3 is outputted. The weighting processing portion 503 outputs in this way a two-bit signal that represents any of 0 to 3. It is possible at this time to remove the noise to a certain extent by conducting the low-pass filter processing to the frame difference signal.

Figure 6B:
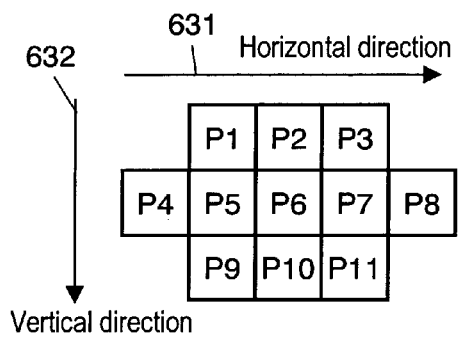

This two-bit signal, the signal obtained by delaying by one line this two-bit signal in the first line memory 504 and the signal obtained by further delaying by one line the output signal of the first line memory 504 by the second line memory 505 are inputted to the first adder 506. The first adder 506 performs the addition processing of the eleven pixels in total with the pixel P6 as the center pixel as one block as shown in FIG. 6B. The output of the weighting processing portion 503 is the pixel P9, the pixel P10 and the pixel P11. The output of the first line memory 504 is the pixel P4, the pixel P5, the pixel P6, the pixel P7 and the pixel P8. The output of the second line memory 505 is the pixel P1, the pixel P2 and the pixel P3. Arrows 631 and 632 are the same as arrows 421 and 422 shown in FIG. 4B. The first adder 506 performs the addition processing of the weighted two-bit values of the eleven pixels of the pixels P1 to P11 and outputs the result as the value of the center pixel P6. In other words, the minimum value of the addition result is 0 and the maximum value is 33. The greater the value, the higher becomes the possibility that the region is the motion portion. The motion coefficient generation portion 507 generates and outputs the motion coefficient 532 for the center pixel P6 by using the non-linear continuous function in accordance with the addition result.

Figure 6D:
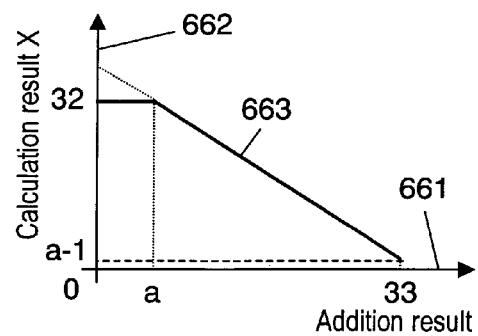
Figure 6C:
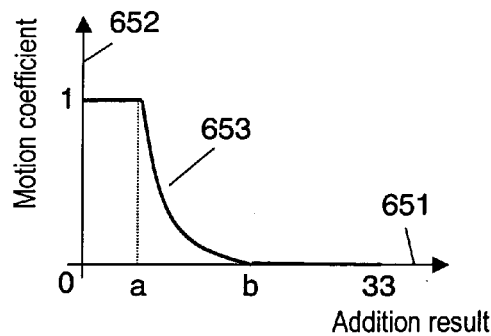

FIG. 6C shows an example of the characteristics of the motion coefficient generation portion 507. In FIG. 6C, abscissa 651 represents the addition result of the first adder 506. Ordinate 652 represents the motion coefficient outputted from the motion coefficient generation portion 507. Line 653 represents the relation between the inputted addition result and the outputted motion coefficient. As shown in FIG. 6C, the smaller the addition result, the closer becomes the motion coefficient to 1. The greater the addition result, the closer becomes the motion coefficient to 0. In other words, a still picture comes closer to 1, and a value closer to 0 is calculated as the motion coefficient in a moving picture having a greater addition result. When a digital processing is executed in practice, integer values such as from 32 to 0 are outputted and are divided by 32 at the end of the processing. At this time, the portion the addition result of which is close to 0 (addition result of no greater than a) has a high possibility that the value results from the noise. Therefore, it is judged as the still picture, that is, the motion coefficient of 1. When the addition result becomes greater (portion in which the addition result is greater than b), the possibility of the moving picture is high. Therefore, the moving picture, that is, the motion coefficient, is set to 0. Non-linear motion coefficients are calculated for the rest of portions by a function of higher order. The addition results at this time are set so that they are 1 and 0 at the positions a and b, respectively.

Figure 6E:
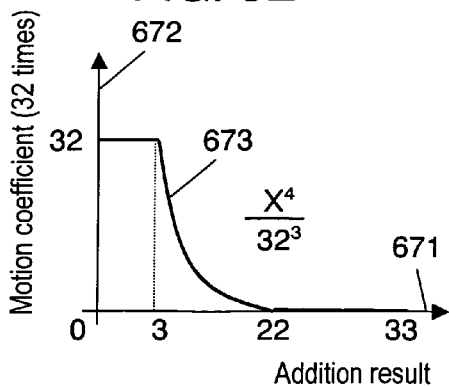

This example will be explained with reference to FIGS. 6D and 6E. In FIG. 6D, abscissa 661 represents the addition result, ordinate 662 represents the calculation result and line 663 represents the relation between the addition result and the calculation result inputted. In FIG. 6E, abscissa 671 represents the addition result, ordinate 672 represents the motion coefficient and line 673 represents the relation between the addition result and the motion coefficient inputted. First, a (integer of 1 or more) is subtracted from the addition result and the result is from (−a) to (33−a). Next, this result is subtracted from 32 and the result is from (a−1) to (32+a). When the result is limited at 32, the result becomes such as line 663. When a 4-order function $(x^4)/(32^3)$ is determined with x representing the calculation result and a representing 3, the motion coefficient shown in FIG. 6E can be obtained.

Here, the motion coefficient is multiplied by 32. (When this motion coefficient is multiplied, it is divided by 32 after multiplication). When the digital processing is taken into consideration, the figures below decimals are omitted in practice. Therefore, the addition result becomes 22 or more and the motion coefficient becomes 0. Since a greater number of motion coefficients can be obtained by only the threshold value used in the weighting processing, a processing using more continuous motion coefficients can be made. In a method that discriminates the motion coefficient by the threshold value, a greater number of threshold values are required to acquire a continuous coefficient, and the problem that control becomes complicated develops. In this embodiment, the weighting processing is executed, addition of the weighting values is made in a predetermined block unit and the motion coefficient is determined from the addition result by using the non-linear function. This method can acquire the continuous motion coefficients having the non-linear characteristics with a smaller circuit scale by conducting weighting. It is of course possible to add the frame difference values as such in the block unit without weighting and to determine the motion coefficient having the non-linear characteristics from the addition result. (This corresponds to the increase of the weighting threshold values). The object of the addition processing in the block unit utilizes the property that the motion portion of the image appears with certain coherence among a plurality of adjacent pixels and randomness that the noise appears at random among the adjacent pixels. Consequently, it becomes possible to discriminate the noise and the motion, to suppress the influences of the noise and to detect only the motion portion of the image.

Embodiment 5

Next, (Embodiment 5) of the invention will be explained in detail.

Figure 7:
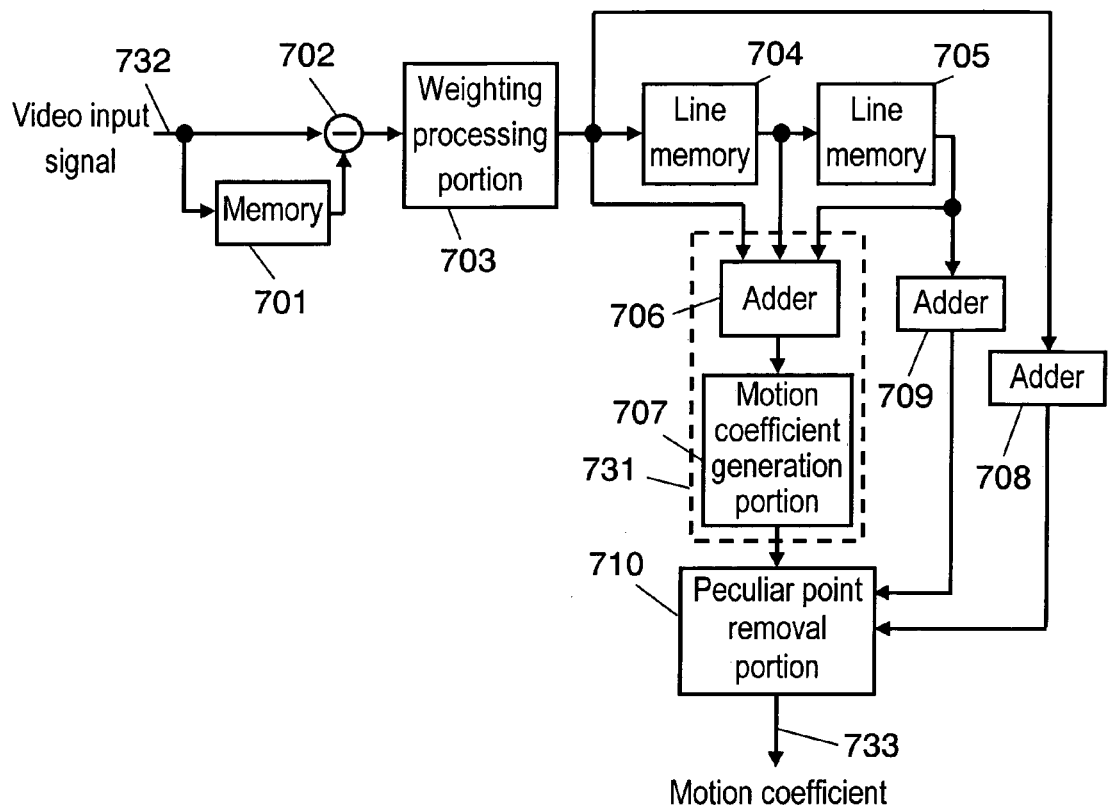
FIG. 7 shows a motion detection apparatus in Embodiment 5 of the invention.

FIG. 7 shows a structural view of a motion detection apparatus in (Embodiment 5) of the invention.

A video input signal 732, a memory 701, a subtracter 702, a weighting processing portion 703, a first line memory (described as line memory in FIG. 7) 704, a second line memory (described as line memory in FIG. 7) 705, a block discrimination portion 731, a first adder (described as adder in FIG. 7) 706, a motion coefficient generation portion 707 and a motion coefficient 733 shown in FIG. 7 respectively correspond to the video input signal 551, the memory 501, the subtracter 502, the weighting processing portion 503, the first line memory 504, the second line memory 505, the block discrimination portion 508, the first adder 506, the motion coefficient generation portion 507 and the motion coefficient 532 shown in FIG. 5. Therefore, detailed explanation of these members will be omitted.

The second adder (described as adder in FIG. 7) 708 calculates the sum of pixels existing on the same line inside the block described above as the processing unit for the output from the weighting processing portion 703. A third adder (described as adder in FIG. 7) 709 calculates the sum of pixels existing on the same line inside the block for the output from the second line memory 705. A peculiar point removal portion 710 corrects the motion coefficient outputted from the motion coefficient generation portion 707 in accordance with the addition result of the second adder 708 and with the addition result of the third adder 709. In other words, the peculiar point removal portion 710 removes those peculiar points that are likely to occur in the processing in the block unit by expanding the motion coefficient outputted from the motion coefficient generation portion 707 in the vertical direction or by expanding the motion portion in the horizontal direction with respect to the motion coefficient from the motion coefficient generation portion 707.

The operation will be explained concretely with reference to a concrete example.

The motion coefficient generation portion 707 outputs the motion coefficient for the video input signal 732 by the same method as that of (Embodiment 4). The second adder 708 adds the two-bit values weighted by the weighting processing portions 703 for the three pixels, that is, the pixel P9, the pixel P10 and the pixel P11 shown in FIG. 6B. The third adder 709 adds the weighted two-bit values for the three pixels, that is, the pixel P1, the pixel P2 and the pixel P3 shown in FIG. 6B. The respective addition results are inputted to the peculiar point removal portion 710.

The peculiar point removal portion 710 removes those peculiar points that are likely to occur in the processing in the block unit by expanding the motion coefficient outputted from the motion coefficient generation portion 707 in the vertical direction or by expanding the motion portion in the horizontal direction with respect to the motion coefficient from the motion coefficient generation portion 707.

Figure 8:
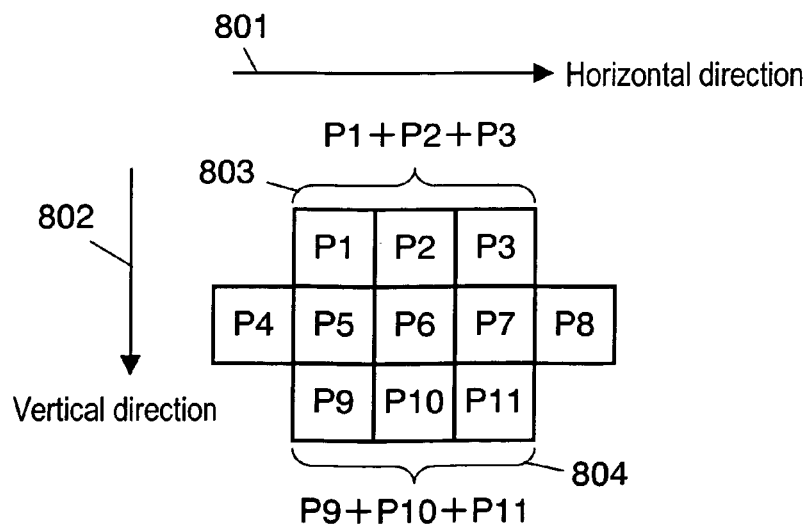
FIG. 8 is an explanatory view of removal of peculiar points in Embodiment 5 of the invention.

Next, an example of the processing in the peculiar point removal portion 710 will be represented. First, the motion portion can be expanded by using the minimum values of one or two pixels on the right and left sides as the motion coefficient of the center pixel with respect to the motion coefficient outputted from the motion coefficient generation portion 707 for each pixel and shown in (Embodiment 4) in FIG. 6E. To expand the motion portion in the vertical direction, the motion coefficient of the center pixel P6 in the processing block unit is corrected by the addition result of the second adder 708 or the third adder 709 (minimum value is 0 and maximum value is 9) as shown in FIG. 8. Arrow 801, arrow 802 and the pixels P1 to P11 in FIG. 8 correspond to the arrows 631 and 632 and the pixels P1 to P11 shown in FIG. 6B, respectively. The peculiar point removal portion 710 corrects the motion coefficient from the motion coefficient generation portion 707 and expands the motion portion by setting the motion coefficient of the pixel P6 to 0 when the addition result is 7 or more, for example. Such a processing can remove the peculiar points that are likely to occur in the processing in the block unit.

Embodiment 6

Next, (Embodiment 6) of the invention will be explained in detail.

Figure 9:
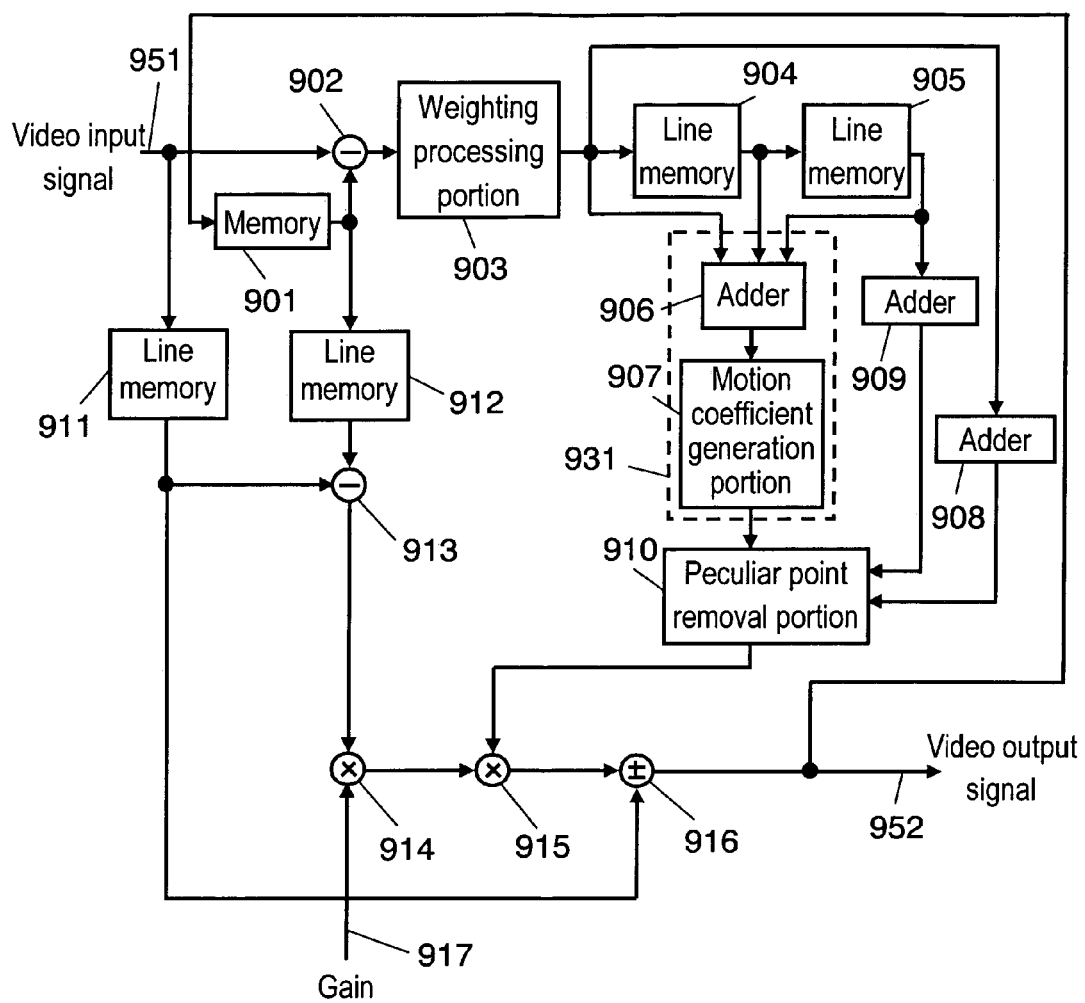
FIG. 9 shows a noise reduction apparatus in Embodiment 6 of the invention.

FIG. 9 shows a structural example of a noise reduction apparatus in (Embodiment 6) of the invention. Each of a video input signal 951, a memory 901, a subtracter 902, a weighting processing portion 903, a first line memory (described as line memory in FIG. 9) 904, a second line memory (described as line memory in FIG. 9) 905, a block discrimination portion 931, a first adder (described as adder in FIG. 9) 906 and a motion coefficient generation portion 907 shown in FIG. 9 respectively has a function similar to that of the video input signal 551, the memory 501, the subtracter 502, the weighting processing portion 503, the first line memory 504, the second line memory 505, the block discrimination portion 531, the first adder 506 and the motion coefficient generation portion 507 shown in FIG. 5. Each block of a second adder (described as adder in FIG. 9) 908, a third adder (described as adder in FIG. 9) 909 and a peculiar point removal portion 910 has a function similar to that of each block of the second adder 708, the third adder 709 and the peculiar point removal portion 710. Therefore, detailed explanation of these members will be omitted.

A fifth line memory 911 (described as line memory in FIG. 9) delays by one line the video input signal 951. A sixth line memory (described as line memory in FIG. 9) 912 delays by one line the signal read out from the memory 901. The second subtracter 913 calculates the difference between the signal from the fifth line memory 911 and the signal from the sixth line memory 912. A first multiplier 914 multiplies the output of the second subtracter 913 by a predetermined gain (0 to 1). A second multiplier 915 multiplies the result of the first multiplier 914 by a motion coefficient decided by the motion coefficient generator 907 and the peculiar point removal portion 910. An adder/substracter 916 adds or subtracts the output of the second multiplier 915 to or from the signal of the fifth line memory 911 in accordance with the sign of the subtraction result in the second subtracter 913. The memory 901 outputs a signal that is obtained by delaying the video output signal 952 from the adder/subtracter 916 by (1 frame-1 line). This is a recursive type noise reduction apparatus using the motion detection apparatus described in (Embodiment 4) or (Embodiment 5).

The operation will be explained with reference to a concrete example.

The subtracter 902 calculates the difference between the signal obtained by delaying by (1 frame-1 line) the video output signal (noise-removed signal) 952 in the memory 901 and the video input signal 951. The reason why the delay amount in the memory 901 is smaller by 1 line than 1 frame is because the output of the motion coefficient is delayed by 1 line from the video input signal 951 in the motion detection apparatus described in (Embodiment 4) or (Embodiment 5). The motion coefficient is decided for this difference through the motion coefficient generation portion 907 and the peculiar point removal portion 910 by the method explained in (Embodiment 4) and (Embodiment 5). On the other hand, the second subtracter 913 calculates the difference between the signal obtained by delaying by 1 line the video input signal 951 in the line memory 911 and the signal obtained by delaying by 1 line the signal from the memory 901 in the sixth line memory 912. The first multiplier 914 multiplies the difference by an arbitrary gain (0 to 1) 917. This gain 917 is a coefficient multiplied independently of the motion coefficient and is one of the factors that decide the recursive amount. When the gain 917 is great, the noise removal effect becomes high. Assuming the case of the digital processing, the first multiplier 914 practically multiplies 32 times, that is, multiplies the difference by an integer value of 0 to 32, and then divides the product by 32. The second multiplier 915 multiplies the result of the first multiplier 914 by the motion coefficient decided by the motion coefficient generation portion 907 and the peculiar point removal portion 910. The motion coefficient such as the coefficient of (Embodiment 4) shown in FIG. 6E, for example, is multiplied at this time. In other words, the second multiplier 915 multiplies the integer value of 0 to 32 in accordance with the motion and then divides the product by 32. In consequence, a uniform gain (recursive amount) for all the pixels multiplied by the first multiplier 914 is adjusted in accordance with the motion amount of the pixels. When the adder/substracter 916 adds or subtracts the result of the second multiplier 915 to or from the signal of the fifth line memory 911 in accordance with the sign of the subtraction result in the second subtracter 913, the noise can be removed.

This noise reduction apparatus employs the motion detection apparatus described in Embodiment 4 or Embodiment 5. When these motion detection apparatuses are employed, motion detection can be conducted while suppressing the influences of the noise from a high electric field to a low electric field and at the same time, a more continuous motion coefficient can be obtained among the adjacent pixels in accordance with the motion amount of the image. Therefore, the noise reduction apparatus in this embodiment can improve the noise removal effect and can reduce the afterimage and unnaturalness of the image for observation that results from the processing using the discontinuous coefficient.

Embodiment 7

Next, (Embodiment 7) of the invention will be explained in detail.

Figure 10:
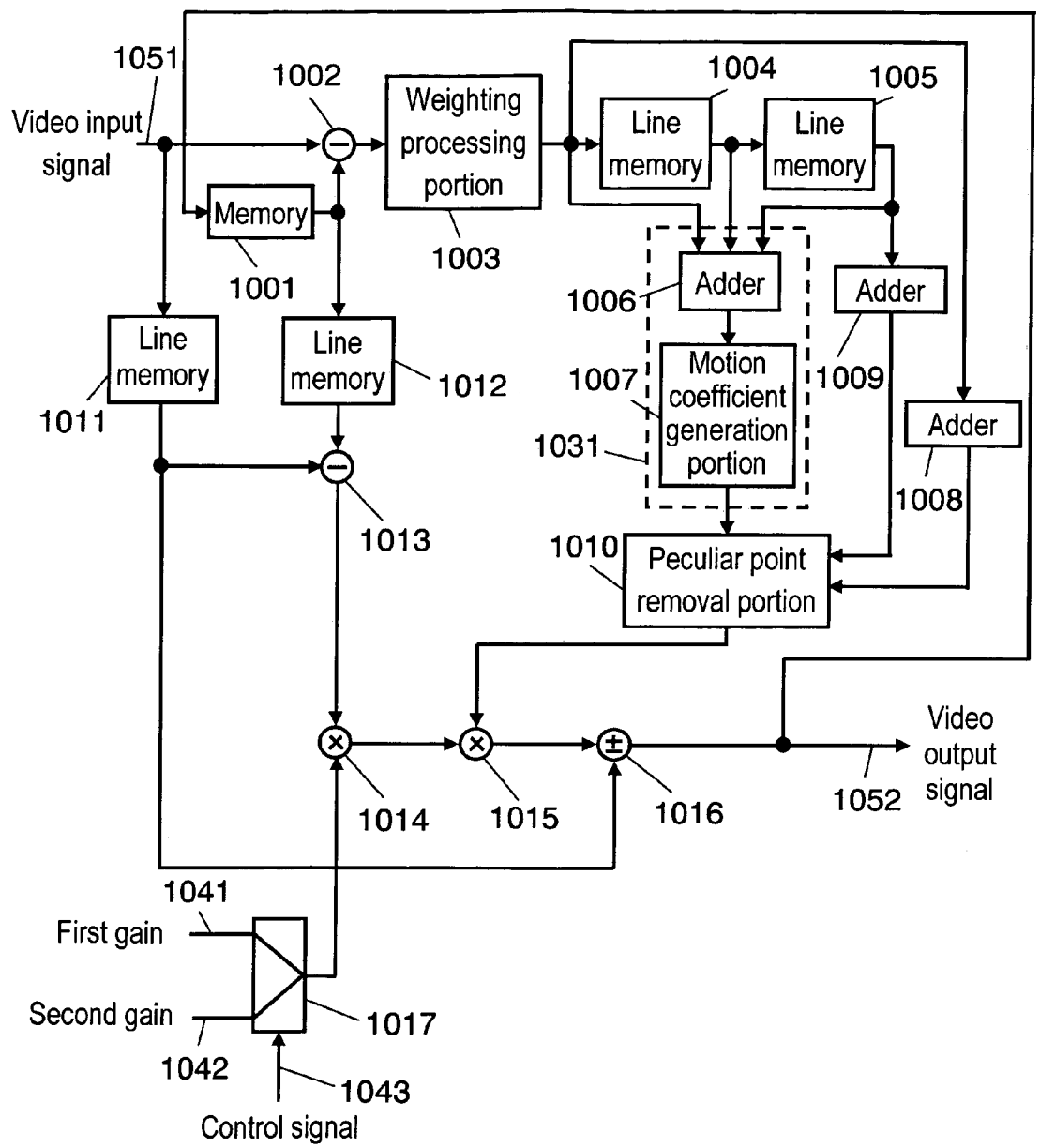
FIG. 10 shows a noise reduction apparatus in Embodiment 7 of the invention.

FIG. 10 shows a structural example of a noise reduction apparatus in (Embodiment 7) of the invention. Each of a video input signal 1051, a memory 1001, a subtracter 1002, a weighting processing portion 1003, a first line memory (described as line memory in FIG. 10) 1004, a second line memory (described as line memory in FIG. 10) 1005, a block discrimination portion 1031, a first adder (described as adder in FIG. 10) 1006 and a motion coefficient generation portion 1007 shown in FIG. 10 respectively has a function similar to that of the video input signal 551, the memory 501, the subtracter 502, the weighting processing portion 503, the first line memory 504, the second line memory 505, the block discrimination portion 508, the first adder 506 and the motion coefficient generation portion 507 shown in FIG. 5. Each block of a second adder (described as adder in FIG. 10) 1008, a third adder (described as adder in FIG. 10) 1009 and a peculiar point removal portion 1010 has a function similar to that of each block of the second adder 708, the third adder 709 and the peculiar point removal portion 710 shown in FIG. 7. Each block of the fifth line memory (described as line memory in FIG. 10) 1011, the sixth line memory (described as line memory in FIG. 10) 1012, the second subtracter 1013, the first multiplier 1014, the second multiplier 1015 and the adder/subtracter 1016 has similar function to that of each block of the fifth line memory 911, the sixth line memory 912, the second subtracter 913, the first multiplier 914, the second multiplier 915 and the adder/subtracter 916 shown in FIG. 9. Therefore, detailed explanation of these members will be omitted.

A first selector 1017 is controlled by a control signal 1043 and selects either one of a first gain 1041 and a second gain 1042. The first selector 1017 switches a plurality of gains in accordance with a control signal 1043 determined for each pixel in the horizontal and vertical directions or in the frame or field direction.

The operation will be hereinafter explained with reference to a concrete example.

In the noise reduction apparatus for removing the noise in accordance with the method shown in (Embodiment 6), the first multiplier 914 multiplies the video input signal 951 by the gain for the difference result of the second subtracter 913. The noise reduction apparatus in this embodiment uses a plurality of gains and switches them in the horizontal and vertical directions or in the frame or field direction for each pixel.

FIGS. 11A and 11B show a switching example. Both drawings show the gain in each pixel inside the frame or field. Symbol G1 represents a first gain 1041 and symbol G2 represents a second gain 1042. A screen 1101 and a screen 1102 are frames or fields adjacent to each other. In the screens 1101 and 1102, G1 and G2 are alternately switched in the horizontal and vertical directions. Furthermore, G1 and G2 are alternately switched also between the screens 1101 and 1102 for the pixels at the same positions inside each screen.

As described above, a control signal 1043 that switches the two gains between the pixels adjacent to each other in the horizontal and vertical directions or in the field or frame direction is generated and is inputted to the first selector 1017. The first selector 1017 switches the two gains in accordance with the control signal 1043. In this case, a fine noise is intentionally applied by setting one of the gains to a smaller level than the other gain. It is thus possible to reduce the after-image and unnaturalness of the image for observation such as a pasting feel of the image in the spatial direction that appear with the increase of the gain. When the gains are switched, one of the gains can be set to a higher level than when the processing is made by using one gain, and a greater noise removal effect can be obtained consequently. Therefore, when the gain is set in such a fashion as to eliminate the pasting feel at a high electric field, one of the gains can be set to 1. In the noise removing process, pixels having the same recursive coefficient are generally likely to gather together (particularly in an area approximate to a still picture). Therefore, unnaturalness of the image for observation such as the pasting feel is likely to occur. However, this phenomenon can be suppressed by controlling the gains in the pixel unit as described above. This method can of course be applied to other noise reduction apparatuses, too.

Embodiment 8

Next, (Embodiment 8) of the invention will be explained in detail.

Figure 12:
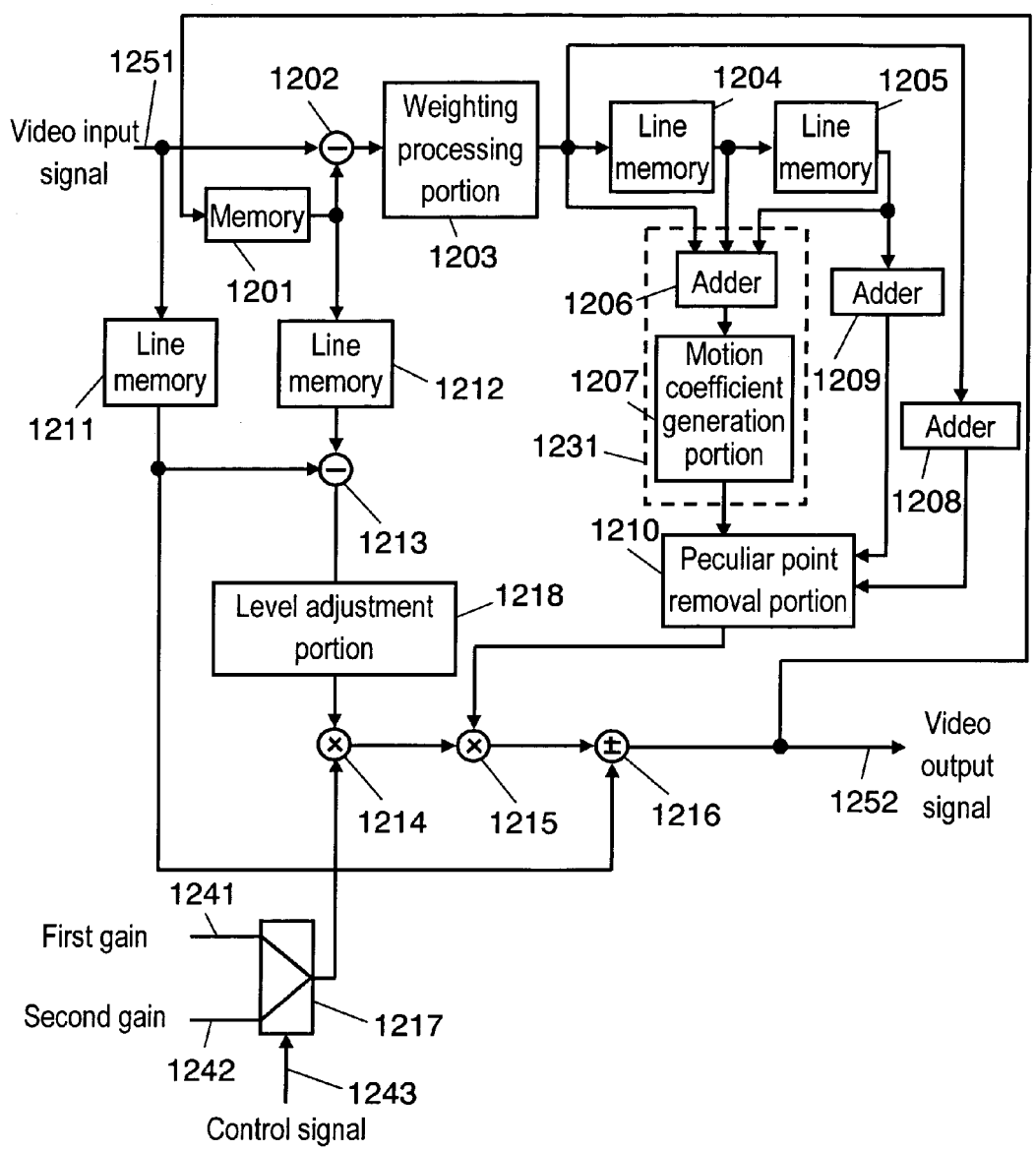
FIG. 12 shows a noise reduction apparatus in Embodiment 8 of the invention.

FIG. 12 shows a structural example of a noise reduction apparatus in (Embodiment 8) of the invention. Each block of a video input signal 1251, a memory 1201, a subtracter 1202, a weighting processing portion 1203, a first line memory (described as line memory in FIG. 12) 1204, a second line memory (described as line memory in FIG. 12) 1205, a block discrimination portion 1231, a first adder (described as adder in FIG. 12) 1206 and a motion coefficient generation portion 1207 shown in FIG. 12 respectively has a function similar to that of the video input signal 551, the memory 501, the subtracter 502, the weighting processing portion 503, the first line memory 504, the second line memory 505, the block discrimination portion 508, the first adder 506 and the motion coefficient generation portion 507 shown in FIG. 5. Each block of a second adder (described as adder in FIG. 12) 1208, a third adder (described as adder in FIG. 12) 1209 and a peculiar point removal portion 1210 has a function similar to that of each block of the second adder 708, the third adder 709 and the peculiar point removal portion 710 shown in FIG. 7. Each block of a fifth line memory (described as line memory in FIG. 12) 1211, a sixth line memory (described as line memory in FIG. 12) 1212, a second subtracter 1213, a first multiplier 1214, a second multiplier 1215 and an adder/subtracter 1216 has similar function to that of each block of the fifth line memory 911, the sixth line memory 912, the second subtracter 913, the first multiplier 914, the second multiplier 915 and the adder/subtracter 916 shown in FIG. 9. A first selector 1217 has a similar function to that of the first selector 1017 shown in FIG. 10. A first gain 1241, a second gain 1242 and a control signal 1243 correspond to the first gain 1041, the second gain 1042 and the control signal 1043 shown in FIG. 10. Therefore, detailed explanation of these members will be omitted.

A level adjustment potion 1218 continuously adjusts an absolute value level of the signal outputted from the second subtracter 1213 to a value smaller than an original absolute value when the absolute value level is not greater than a predetermined level. The value so adjusted is inputted to the first multiplier 1214.

The operation will be hereinafter explained with reference to a concrete example.

In the noise reduction apparatuses described in (Embodiment 6) and (Embodiment 7), the first multiplier 1214 multiplies the difference result in the second subtracter 1213 by the gain for the video input signal 1251. In this embodiment, when the absolute value of this difference is smaller than a predetermined value, the level adjustment portion 1218 continuously adjusts the absolute value of the difference to a value smaller than the original value.

Figure 13:
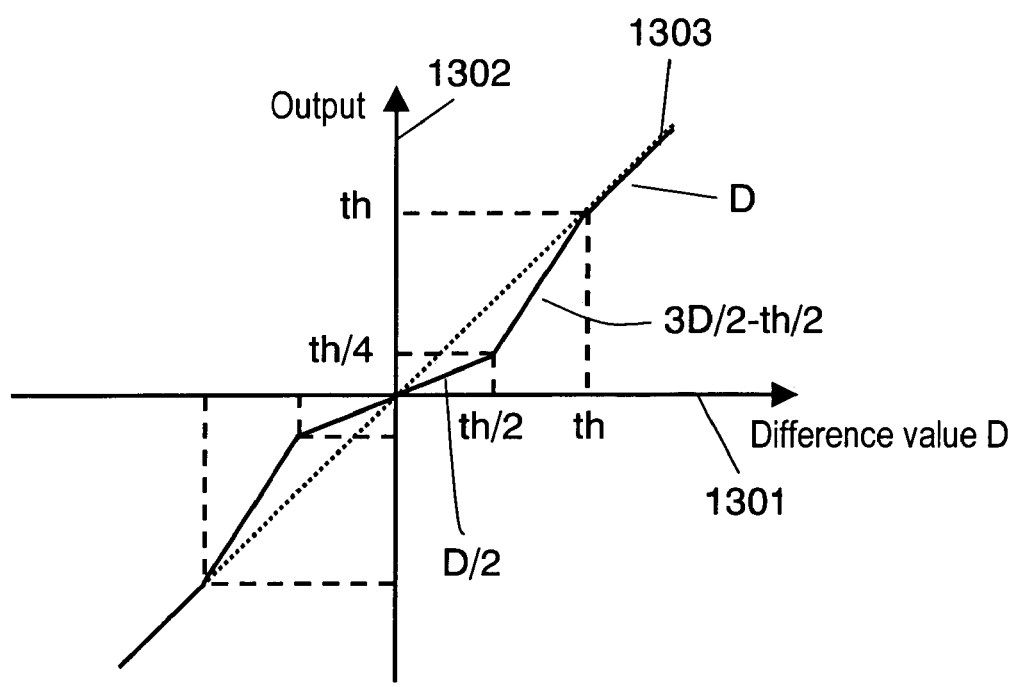
FIG. 13 is an explanatory view of level adjustment in Embodiment 8 of the invention.

FIG. 13 shows an example of input/output characteristics of the level adjustment portion 1218. In FIG. 13, abscissa 1301 represents the difference value inputted to the level adjustment portion 1218. Ordinate 1302 represents the value inputted from the level adjustment portion 1218 and bent line 1303 represents the input/output relation of the level adjustment portion 1218. It will be assumed hereby that the difference value inputted to the level adjustment portion 1218 is D and a threshold value is th. The level adjustment portion 1218 outputs D/2 when the difference value D inputted is not greater than th/2, 3D/2-th/2 when D is from th/2 to th, and D when D is not smaller than th. Due to the input/output characteristics, the noise removal effect becomes small at the difference value smaller than the threshold value th. This intentionally limits the noise removal amount at a low level to a certain extent. Incidentally, unnaturalness of the image for observation such as a filming feel of the entire screen is likely to occur in the noise removing processing at a low electric field. This embodiment leaves the noise of the low level to a certain extent and can reduce this unnaturalness of the image for observation. It is thus possible to control the threshold value in accordance with the level of the electric field, to nullify the level adjustment at a high electric field and to limit the noise removal amount of the low level as the electric field becomes lower. Because the threshold value of the weighting processing portion 1203 is increased at the low electric field, the filming feel is likely to increase with the noise removing processing. However, when the level adjustment described above is made, the remarkable noise having a high level can be mainly removed while unnaturalness of the image for observation is restricted. Several methods of the level adjustment may be possible such as a method that lowers the gain below the threshold value instead of adjusting the difference value, but they are the same in the point that the noise removal effect of the low difference level is restricted.

Embodiment 9

Next, (Embodiment 9) of the invention will be explained in detail.

Figure 14:
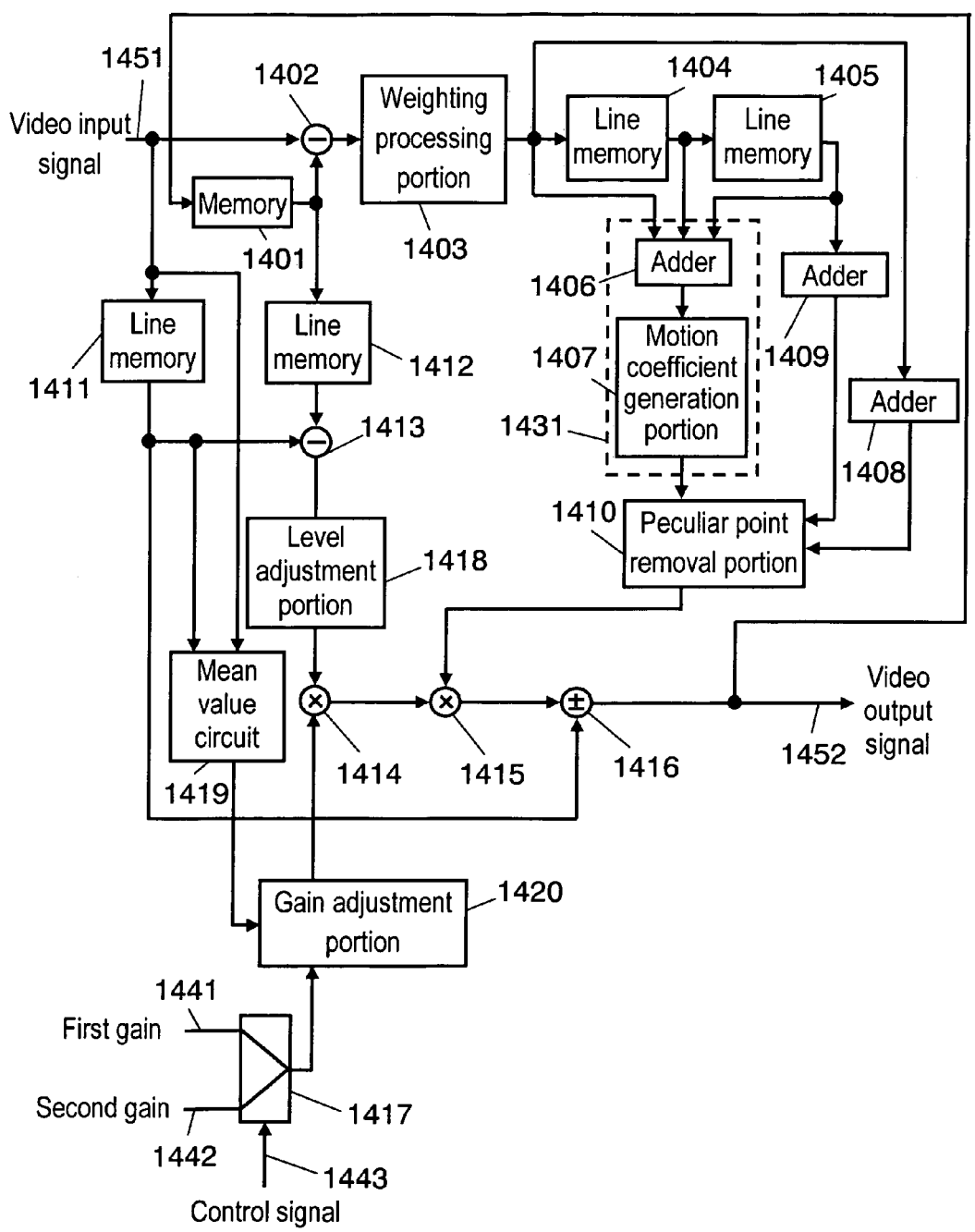
FIG. 14 shows a noise reduction apparatus in Embodiment 9 of the invention.

FIG. 14 shows a structural example of a noise reduction apparatus in (Embodiment 9) of the invention. Each block of a memory 1401, a subtracter 1402, a weighting processing portion 1403, a first line memory (described as line memory in FIG. 14) 1404, a second line memory (described as line memory in FIG. 14) 1405, a first adder (described as adder in FIG. 14) 1406, a motion coefficient generator 1407 and a block discrimination portion 1431 shown in FIG. 14 respectively has a function similar to that of the memory 501, the subtracter 502, the weighting processing portion 503, the first line memory 504, the second line memory 505, the first adder 506, the motion coefficient generation portion 507 and the block discrimination portion 508 shown in FIG. 5. Each block of a second adder (described as adder in FIG. 14) 1408, a third adder (described as adder in FIG. 14) 1409 and a peculiar point removal portion 1410 has a function similar to that of each block of the second adder 708, the third adder 709 and the peculiar point removal portion 710 shown in FIG. 7. Each block of a fifth line memory (described as line memory in FIG. 14) 1411, a sixth line memory (described as line memory in FIG. 14) 1412, a second subtracter 1413, a first multiplier 1414, a second multiplier 1415 and an adder/subtracter 1416 has similar function to that of each block of the fifth line memory 911, the sixth line memory 912, the second subtracter 913, the first multiplier 914, the second multiplier 915 and the adder/subtracter 916 shown in FIG. 9. A first selector 1417 has a similar function to that of the first selector 1017 shown in FIG. 10. The level adjustment portion 1418 has a similar function to that of the level adjustment portion 1218 shown in FIG. 12. A first gain 1441, a second gain 1442 and a control signal 1443 correspond to the first gain 1041, the second gain 1042 and the control signal 1043 shown in FIG. 10, respectively. Therefore, detailed explanation of these members will be omitted.

A mean value circuit 1419 calculates the sum of corresponding pixels inside the processing block shown in (Embodiment 4) for the video input signal 1451 and signal of the fifth line memory 1411 and calculates a mean signal level. A gain adjustment portion 1420 adjusts the gain multiplied by the first multiplier 1414 in accordance with the mean value calculated by the mean value circuit 1419.

The operation will be explained below with reference to specific examples.

In the noise reduction apparatus for removing the noise by the method described in (Embodiment 8), the first multiplier 1414 multiplies the output of the level adjustment portion 1418 by the gain outputted from the first selector 1417. In this embodiment, this gain is controlled on the basis of the pixel as the processing object and the mean signal level of its peripheral pixels.

Figure 15A:
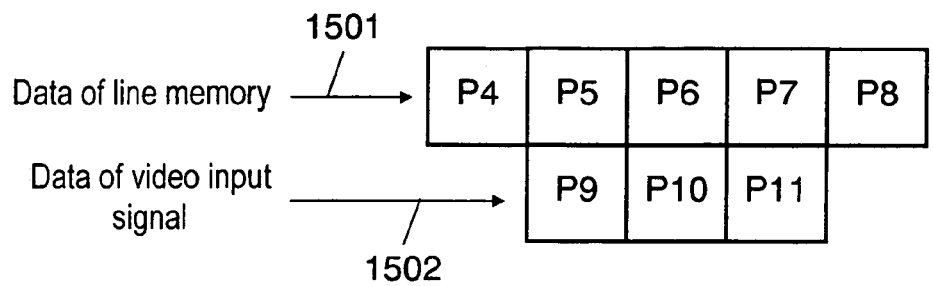
FIGS. 15A and 15B are explanatory views of gain control in Embodiment 9 of the invention.
Figure 15B:
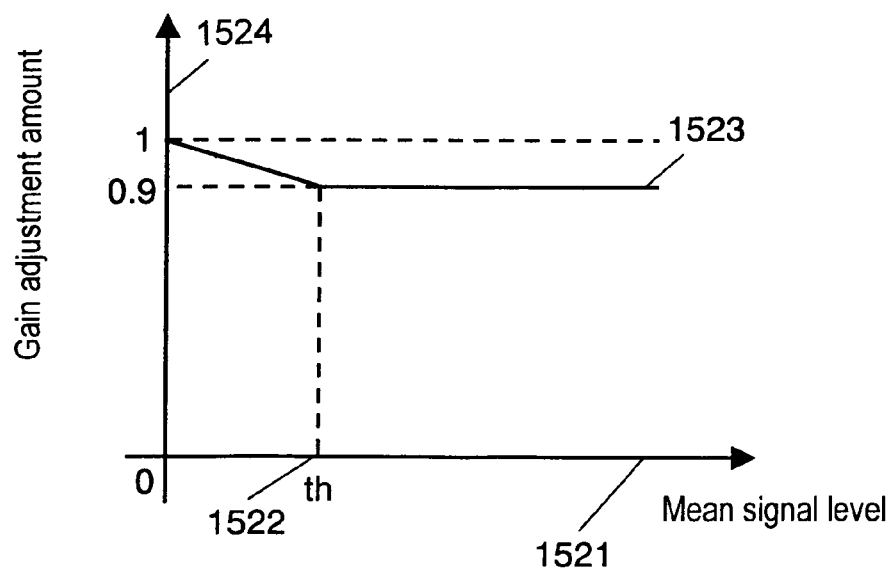

FIGS. 15A and 15B show an example of such control. As shown in FIG. 15A, the mean value circuit 1419 calculates the mean signal level Of the pixels corresponding to the inside of the processing block represented in (Embodiment 4) in the data 1502 of the video input signal 1451 and the data 1501 from the fifth line memory 1411, that is, the eight pixels corresponding to the pixels P4 to P11 in FIG. 6B. The gain adjustment portion 1420 adjusts the gain in accordance with this mean signal level. The gain adjustment portion 1420 relatively decreases the gain for those portions which have a higher mean signal level, that is, for bright portions, and relatively increases the gain for portions having a low brightness level, that is, for dark portions.

FIG. 15B shows an example of characteristics of the gain adjustment portion 1420. In FIG. 15B, abscissa 1521 represents the mean signal level from the mean value circuit 1419. Ordinate 1524 represents a gain adjustment amount in the gain adjustment portion 1420. Broken line represents an example of the relation of the mean signal level and the gain adjustment amount. Here, the gain adjustment portion 1420 adjusts step-wise the gain from the first selector 1417 as shown in FIG. 15B, for example, and sets the gain to about 90% for a level higher than a certain mean signal level th. In other words, original gain setting is made with reference to the case where the mean signal level is low. Since the gain is adjusted by the mean signal level in this way, the noise removal effect can be improved for each pixel in a region having a low signal level in which the noise amount is likely to become great inside the same frame and inside the same field, too. It is not necessary to employ an corporation arrangement with an AGC circuit. Incidentally, the mean signal level is determined by putting the irregular eight pixels into one block from the aspects of the circuit and the calculation amount, but this block can be decided arbitrarily. An essential point is to determine the mean signal level of a plurality of pixels and to adjust the gain by the mean signal level. In a method that uses the input signal level itself, fluctuation of the control level is likely to occur in the spatial direction due to influences of the noise. To reduce this fluctuation, the embodiment executes averaging from the peripheral pixels and uses the mean for control.

Embodiment 10

Next, (Embodiment 10) of the invention will be explained in detail.

Figure 16:
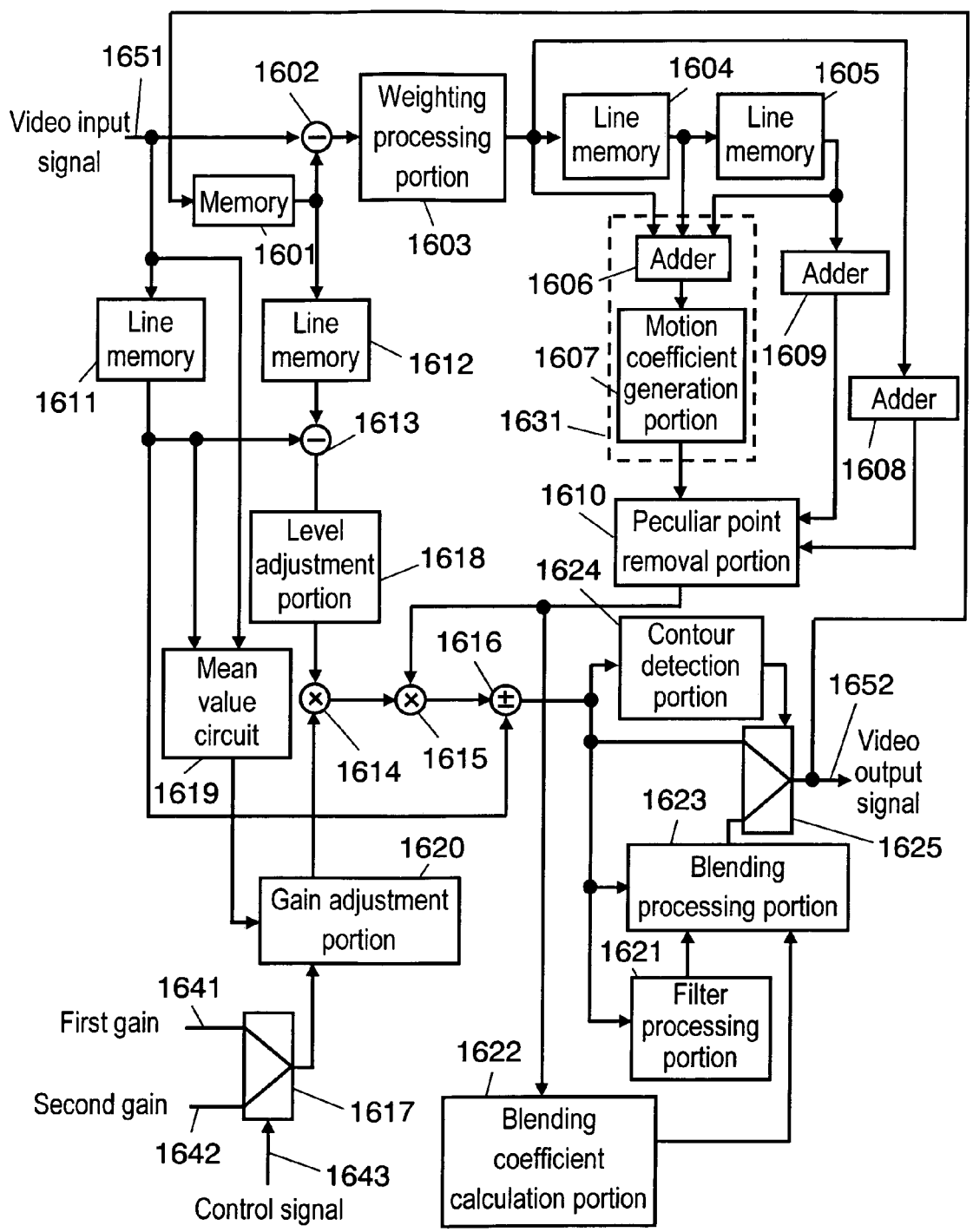
FIG. 16 shows a noise reduction apparatus in Embodiment 10 of the invention.

FIG. 16 shows a structural example of a noise reduction apparatus in (Embodiment 10) of the invention.

Each block of a memory 1601, a subtracter 1602, a weighting processing portion 1603, a first line memory (described as line memory in FIG. 16) 1604, a second line memory (described as line memory in FIG. 16) 1605, a first adder (described as adder in FIG. 16) 1606, a motion coefficient generator 1607 and a block discrimination portion 1631 shown in FIG. 16 respectively has a function similar to that of the memory 501, the subtracter 502, the weighting processing portion 503, the first line memory 504, the second line memory 505, the first adder 506, the motion coefficient generation portion 507 and the block discrimination portion 508 shown in FIG. 5. Each block of a second adder (described as adder in FIG. 16) 1608, a third adder (described as adder in FIG. 16) 1609 and a peculiar point removal portion 1610 has a function similar to that of each block of the second adder 708, the third adder 709 and the peculiar point removal portion 710 shown in FIG. 7. Each block of a fifth line memory (described as line memory in FIG. 16) 1611, a sixth line memory (described as line memory in FIG. 16) 1612, a second subtracter 1613, a first multiplier 1614, a second multiplier 1615 and an adder/subtracter 1616 has similar function to that of each block of the fifth line memory 911, the sixth line memory 912, the second subtracter 913, the first multiplier 914, the second multiplier 915 and the adder/subtracter 916 shown in FIG. 9. A first selector 1617 has a similar function to that of the first selector 1017 shown in FIG. 10. A level adjustment portion 1618 has a function similar to that of the level adjustment portion 1218 shown in FIG. 12. A mean value circuit 1619 and a gain adjustment portion 1620 have a function similar to those of the mean value circuit 1419 and the gain adjustment portion 1420 shown in FIG. 14, respectively. Therefore, detailed explanation of these members will be omitted.

A filter processing portion 1621 executes a low-pass filter processing in the spatial direction for the output of the adder/subtracter 1616. A blending coefficient calculation portion 1622 decides a blending ratio of the output of the filter processing portion 1621 and the output signal of the adder/subtracter 1616 in accordance with a value of a continuous motion coefficient obtained from the motion coefficient generation portion 1607 and from the peculiar point removal portion 1610. A blending processing portion 1623 blends the output of the filter processing portion 1621 and the output signal of the adder/subtracter 1616 at the blending coefficient decided by the blending coefficient calculation portion 1622. A contour detection portion 1624 extracts a contour portion of the image from the output signal of the adder/subtracter 1616. A second selector 1625 switches the output of the blending processing portion 1623 and the output signal of the adder/subtracter 1616 by the output from the contour detection portion 1624.

The operation will be hereinafter explained with reference to a concrete example.

Figure 17:
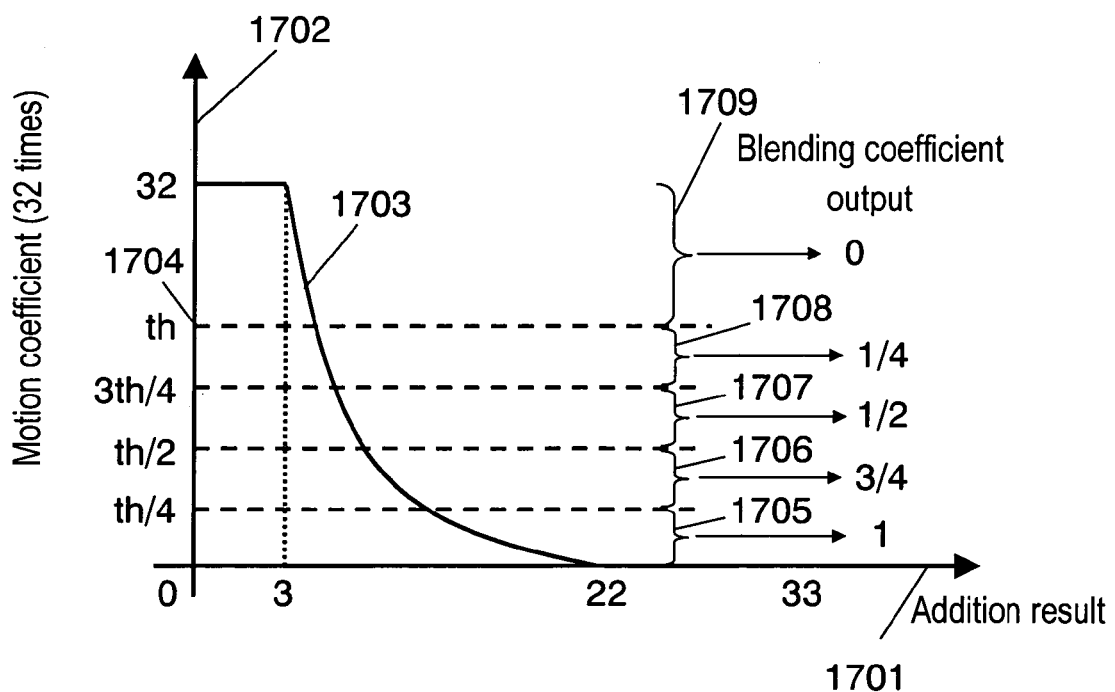
FIG. 17 is an explanatory view of a calculation method of a blending coefficient in Embodiment 10 of the invention.
Figure 18A:
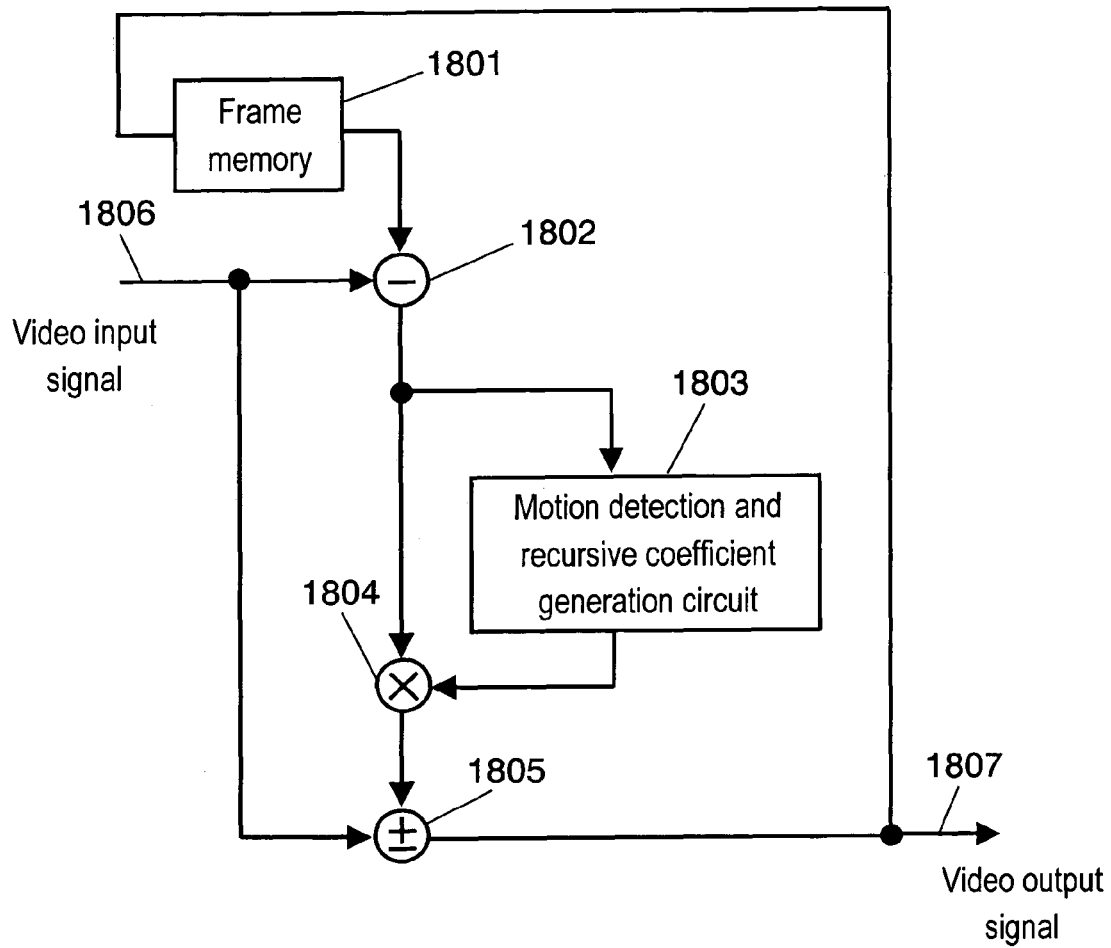
FIGS. 18A and 18B show a frame recursive type noise reduction apparatus in a prior art example.
Figure 18B:
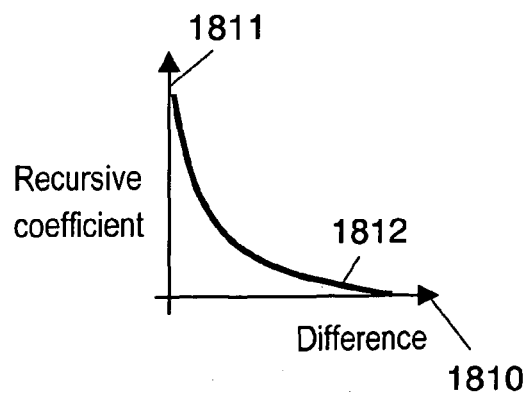

In this embodiment, the filter processing portion 1621 executes the low-pass filter processing in the spatial direction for the output signal from the noise reduction apparatus that removes the noise from the video input signal 1651 by the methods described in (Embodiment 6), (Embodiment 7), (Embodiment 8) and (Embodiment 9). The filter processing portion 1621 shown in FIG. 16, for example, uses a filter in only the horizontal direction without adding a line memory. When the output signal of this filter processing portion 1621 and the input signal of the filter processing portion 1621 are blended, the effect of the spatial filter is adjusted. At this time, the blending coefficient calculation portion 1622 decides the blending coefficient from the values of the motion coefficients obtained from the motion coefficient generation portion 1607 and the peculiar point removal portion 1610. In other words, the residual noise is likely to occur in the moving picture portion at which the noise cannot be easily removed in conjunction with the influences of the after-image, etc, in the noise reduction apparatuses shown in (Embodiment 6), (Embodiment 7), (Embodiment 8) and (Embodiment 9). In consequence, unnaturalness of the image for observation occurs in some cases. Therefore, the ratio of blending shown in FIG. 17 is set for the motion coefficient in (Embodiment 4) shown in FIG. 6E, for example.

This blending ratio will be explained with reference to FIG. 17. Abscissa 1701, ordinate 1702 and curve 1703 in FIG. 17 respectively correspond to the abscissa 671, the ordinate 672 and the curve 673 shown in FIG. 6E. Therefore, detailed explanation of them will be omitted. As shown in FIG. 17, the blending ratio of the filter in the spatial direction is greater for the pixels closer to the moving picture, that is, the pixels having a smaller motion coefficient. A certain threshold value th1704 is set. The blending ratio of the output of the filter processing portion 1621 is set to 0 (that is, the output itself of the noise reduction apparatus shown in embodiments before (Embodiment 9)) in a region 1709 having a motion coefficient 1702 of greater than th (close to the still picture), to ¼ in a region 1708 of 3th/4 to less than th, to ½ in a region 1707 of th/2 to less than 3th/4, to ¾ in a region 1706 of th/4 to less than th/2 and to 1 (output itself of the filter processing portion 1621) in a region 1705 of less than th/4. The effect of the filter in the spatial direction can be controlled by changing this threshold value th1704. It is advisable to increase this threshold when the electric field becomes lower. Incidentally, several calculation methods may be possible to calculate the blending coefficient (the blending ratio described above) by using a function. Because the blending processing portion 1623 blends the signal not subjected to the filter treatment and the signal subjected to the filter processing at the blending coefficient determined in this way, the effect of the filter processing in the spatial direction can be adjusted in accordance with the motion amount. To prevent the image from becoming obscure when the filter in the spatial direction is applied, the contour detection portion 1624 detects the contour portion. The second selector 1625 is controlled in such a fashion that when the filter is applied in only the horizontal direction, the horizontal difference is calculated and the contour is judged when this difference exceeds a certain level, but the filter in the spatial direction is not applied to one or two pixels on both sides. As a result, the signal not subjected to the filter processing is outputted. This processing can reduce unnaturalness of the image for observation in the moving picture portion due to the residual noise that is likely to occur with the recursive type noise removal processing. At the same time, obscurity of the contour portion resulting from the filter processing in the spatial direction can be suppressed to a certain extent.

As described above, the invention calculates the frame difference between the signal obtained by frame-delaying the video output signal and the video input signal by utilizing randomness of the noise and compares this difference with a predetermined threshold value. As a result, the invention calculates the sum of the block of several pixels adjacent to each center pixel in the horizontal and vertical directions for the signal that is outputted as a result, compares this sum with a predetermined threshold value and outputs a desired signal as the value of the center pixel of the block. Further, the invention removes the peculiar points that are likely to occur in the processing in the block unit by expanding this output in the horizontal or vertical direction for several pixels, or by expanding the output in the direction of the time axis or by comparing it with the signal before processing in the block discrimination portion in each pixel. By so doing only the motion portion of the image can be detected while suppressing the influences of the noise contained in the video input signal. Furthermore, when the frame difference is multiplied by a desired coefficient and is added or subtracted to or from the video input signal, the signal from which the noise is removed and the video input signal are selected for each pixel in accordance with this motion detection result to give the video output signal. The noise removal effect can be improved in this way and the problem of tailing resulting from the motion of the image can be suppressed.

In addition to detection of the motion portion having a large frame difference value for the video input signal containing the noise, the invention discriminates the motion portion of the image having a frame difference value equal to or lower than the noise level from the noise, detects the motion of the image with the reduced influences of the noise and further constitutes the noise removal apparatus using the method. In this way, the invention improves the noise removal effect much more than the prior art and can suppress the occurrence of tailing of the motion portion resulting from the increase of the noise removal effect.

The invention can reduce unnaturalness of the image for observation of noise amount between the noise-removed portion and the not-removed portion.

The invention provides a motion detection apparatus using a method that executes motion detection from several kinds of pixel information in the spatial direction by utilizing randomness of the noise and limits the circuit scale without using a lookup table, and outputs continuous motion coefficients in accordance with the motion amount of the image among the adjacent pixels. By constituting a noise reduction apparatus using the motion detection apparatus, the invention improves the noise removal effect and at the same time, makes it possible to suppress the after-image and unnaturalness for observation of the image resulting from the processing using discontinuous coefficients.

In dark portions in which the noise amount is likely to become great relative to the periphery, the invention suppresses the influences of the noise without using information of an AGC circuit and adaptively improves the noise removal effect. The invention reduces unnaturalness of the image for observation due to the residual noise of the motion portion resulting from noise removal, improves the noise removal effect for both moving picture and still picture from a high electric field to a low electric field and compatibly prevents the after-image and unnaturalness of the image for observation resulting from the improvement of the noise removal effect.

According to the invention, there is provided a motion detection apparatus that executes the addition processing with a plurality of adjacent pixels as one processing unit for the weighted frame or field difference and outputs a continuous motion coefficient by a non-linear function without using a threshold value. Then, because the noise and the motion are discriminated by utilizing randomness of the noise, a continuous motion coefficient can be provided in accordance with the motion of the image while the influences of the noise contained in the input signal are suppressed. When a recursive type noise reduction apparatus is constituted by using this feature, it becomes possible to improve the noise removal effect and to reduce the after-image and unnaturalness of the image for observation of the image resulting from the processing using the non-discontinuous coefficient. Furthermore, when a plurality gains is switched for each pixel, a fine noise can be intentionally added and the after-image and unnaturalness of the image for observation such as pasting feel of the noise in the spatial direction resulting from the increase of the gain can be reduced. In addition, the improvement of the noise removal effect by increasing the gain can be accomplished. In a low electric field, a difference value of a low level is adjusted so that the noise removal effect of the low difference level can be limited intentionally. Consequently, unnaturalness of the image for observation such as filming feel can be reduced and at the same time, the noise of a remarkably high level can be removed with priority. When the gain is adjusted on the basis of a mean signal level for a plurality of adjacent pixels, the noise removal effect can be improved for each pixel in a region in which the noise amount is likely to be great and which has a low signal level inside the same screen. When a filter in the spatial direction is adaptively used in combination with the motion coefficient from the motion detection apparatus and contour information from a contour detection portion, unnaturalness of the image for observation of the moving picture portion resulting from the residual noise that is likely to occur in the recursive type noise removal processing can be obtained without obscuring the contour of the motion portion.

When such a recursive type noise reduction apparatus is used, the improvement of the noise removal effect of the moving picture and the still picture from the high electric field to the low electric field and reduction of the after-image and unnaturalness of the image for observation such as pasting feel of the image resulting from the improvement of the noise removal effect can be simultaneously accomplished.

The invention can improve the noise removal effect for each pixel in a region having a low signal level in which the noise amount is likely to become great inside the same screen.

The invention can reduce unnaturalness for observation of the moving picture portion resulting from the residual noise that is likely to occur with the recursive type noise removing processing without obscuring the contour of the motion portion.

As described above, when the recursive type noise reduction apparatus is used, the improvement of the noise removal effect of the moving picture and the still picture from the high electric field to the low electric field and reduction of the after-image and unnaturalness of the image for observation resulting from the improvement of the noise removal effect can be simultaneously accomplished.

INDUSTRIAL APPLICABILITY

The motion detection apparatus and the noise reduction apparatus using the former according to the invention can improve the noise reduction effect and can suppress the occurrence of tailing of the motion portion resulting from the increase of the noise removal effect. Further, the invention can improve the noise removal effect from the high electric field to the low electric field and can eliminate the after-image and unnaturalness of the image for observation such as pasting feel resulting from the increase of the noise removal effect.

The invention claimed is:

1. A noise reduction apparatus comprising:
   a frame memory for frame-delaying one of a video input signal and a video output signal from the noise reduction apparatus;
   a subtracter for calculating a difference between the video input signal and a frame delay signal read out from the frame memory;
   a comparison portion for comparing an output of the subtracter with an arbitrary threshold value;
   a first line memory for delaying a signal outputted from the comparison portion;
   a second line memory for further delaying the signal of the first line memory; and
   a block discrimination portion for calculating a sum of pixels inside a block constituted by each pixel of a video signal as a center and a plurality of pixels adjacent to the center pixel in both horizontal and vertical directions, and comparing the sum with an arbitrary threshold value, wherein the pixels constituting the block are acquired from the comparison portion, the first line memory and the second line memory.

2. The noise reduction apparatus as defined in claim 1, further comprising:
   a peculiar point removal portion for removing a peculiar point occurring in the processing of the block discrimination portion in the block unit and outputting a motion detection result signal by:
   applying in escalation the result of the block discrimination portion to a plurality of pixels in the horizontal or vertical direction; or
   applying in escalation the result in a direction of a time axis; or
   comparing the result with a signal before processing in the block discrimination portion in each pixel.

3. The noise reduction apparatus as defined in claim 2,
   wherein the comparison portion comprises a weighting processing portion for weighting the output of the subtracter to a plurality of levels by using an arbitrary threshold value in accordance with the value of the output; and
   wherein the block discrimination portion comprises:
   a first adder for calculating the sum of the pixels inside the block for the output from the weighting processing portion, for the output from the first line memory and for the output from the second line memory; and
   a motion coefficient generation portion for outputting a motion coefficient for the center pixel of the block by using a non-linear continuous function in accordance with the addition result by the adder.

4. The noise reduction detection apparatus as defined in claim 3, further comprising:
   a second adder for calculating the sum of the pixels existing on the same line inside the block for the output from the weighting processing portion; and
   a third adder for calculating the sum of the pixels existing on the same line inside the block for the output from the second line memory,
   wherein the peculiar point removal portion corrects the motion coefficient in accordance with the result of the second adder and with the result of the third adder, and removes a peculiar point that is likely to occur in the processing in the block unit by expanding the motion portion in the vertical direction or by expanding the motion portion in the horizontal direction or by expanding the motion portion in the frame/field direction for the motion coefficient from the motion coefficient generation portion.

5. The noise reduction apparatus as defined in claim 1,
   wherein the comparison portion comprises a weighting processing portion for weighting the output of the subtracter to a plurality of levels by using an arbitrary threshold value in accordance with the value of the output; and
   wherein the block discrimination portion comprises:
   a first adder for calculating the sum of the pixels inside the block for the output from the weighting processing portion, for the output from the first line memory and for the output from the second line memory; and
   a motion coefficient generation portion for outputting a motion coefficient for the center pixel of the block by using a non-linear continuous function in accordance with the addition result by the adder.

6. The noise reduction apparatus as define in claim 5, further comprising:
   a second adder for calculating the sum of the pixels existing on the same line inside the block for the output from the weighting processing portion; and
   a third adder for calculating the sum of the pixels existing on the same line inside the block for the output from the second line memory,
   wherein the peculiar point removal portion corrects the motion coefficient in accordance with the result of the second adder and with the result of the third adder, and removes a peculiar point that is likely to occur in the processing in the block unit by expanding the motion portion in the vertical direction or by expanding the motion portion in the horizontal direction or by expanding the motion portion in the frame/field direction for the motion coefficient from the motion coefficient generation portion.

7. A noise reduction apparatus as defined in claim 1, further comprising:
   a peculiar point removal portion for removing a peculiar point occurring in the processing of the block discrimination portion in the block unit and outputting a motion detection result signal by:
   applying in escalation the result of the block discrimination portion to a plurality of pixels in the horizontal or vertical direction; or
   applying in escalation the result in a direction of a time axis; or
   comparing the result with a signal before processing in the block discrimination portion in each pixel;
   a noise reduction processing portion for removing noise by multiplying the output of the subtracter by a coefficient and conducting addition/subtraction to and from the video input signal.

8. A noise reduction apparatus as defined in claim 7, further comprising:
   a third line memory for delaying the output from the noise reduction processing portion by a line delay amount of the comparison portion and the peculiar point removal portion;
   a fourth line memory for delaying the video input signal by a line delay amount of the comparison portion and the peculiar point removal portion;
   a selector for selecting the output of the third line memory and the output of the fourth line memory in accordance with the motion detection result and outputting the video output signal; and a filter for conducting a filter processing for the output of the fourth line memory, inserted between the fourth line memory and the selector;
wherein the video output signal selected by the selector is inputted to the frame memory.

9. The noise reduction apparatus as defined in claim 7, further comprising:
a third line memory for delaying the output from the noise reduction processing portion by a line delay amount of the comparison portion and the peculiar point removal portion;
a fourth line memory for delaying the video input signal by a line delay amount of the comparison portion and the peculiar point removal portion; and
a selector for selecting the output of the third line memory and the output of the fourth line memory in accordance with the motion detection result and outputting the video output signal, and
a filter for conducting a filter processing for the output of the fourth line memory, inserted between the fourth line memory and the selector,
wherein the video output signal selected by the selector is inputted to the frame memory.

10. A noise reduction apparatus comprising:
a motion detection apparatus comprising:
a frame memory for frame-delaying one of a video input signal and a video output signal from the noise reduction apparatus;
a subtracter for calculating a difference between the video input signal and a frame delay signal read out from the frame memory;
a comparison portion for comparing an output of the subtracter with an arbitrary threshold value;
a first line memory for delaying a signal outputted from the comparison portion;
a second line memory for further delaying the signal of the first line memory; and
a block discrimination portion for calculating a sum of pixels inside a block constituted by each pixel of a video signal as a center and a plurality of pixels adjacent to the center pixel in both horizontal and vertical directions, and comparing the sum with an arbitrary threshold value, wherein the pixels constituting the block are acquired from the comparison portion, the first line memory and the second line memory;
a noise reduction processing portion for removing noise by multiplying the output of the subtracter by a coefficient and conducting addition/subtraction to and from the video input signal.

11. The noise reduction apparatus as defined in claim 10, further comprising:
a third line memory for delaying the output from the noise reduction processing portion by a line delay amount of the comparison portion and the peculiar point removal portion;
a fourth line memory for delaying the video input signal by a line delay amount of the comparison portion and the peculiar point removal portion; and
a selector for selecting the output of the third line memory and the output of the fourth line memory in accordance with the motion detection result and outputting the video output signal,
a filter for conducting a filter processing for the output of the fourth line memory, inserted between the fourth line memory and the selector,
wherein the video output signal selected by the selector is inputted to the frame memory.

12. A noise reduction apparatus comprising:
a motion detection apparatus comprising:
a frame memory for frame-delaying one of a video input signal and a video output signal from the noise reduction apparatus;
a subtracter for calculating a difference between the video input signal and a frame delay signal read out from the frame memory;
a comparison portion for comparing an output of the subtracter with an arbitrary threshold value;
a first line memory for delaying a signal outputted from the comparison portion;
a second line memory for further delaying the signal of the first line memory; and
a block discrimination portion for calculating a sum of pixels inside a block constituted by each pixel of a video signal as a center and a plurality of pixels adjacent to the center pixel in both horizontal and vertical directions, and comparing the sum with an arbitrary threshold value, wherein the pixels constituting the block are acquired from the comparison portion, the first line memory and the second line memory;
wherein the comparison portion comprises a weighting processing portion for weighting the output of the subtracter to a plurality of levels by using an arbitrary threshold value in accordance with the value of the output; and
wherein the block discrimination portion comprises:
a first adder for calculating the sum of the pixels inside the block for the output from the weighting processing portion, for the output from the first line memory and for the output from the second line memory; and
a motion coefficient generation portion for outputting a motion coefficient for the center pixel of the block by using a non-linear continuous function in accordance with the addition result by the adder
a third line memory for delaying by one line the video input signal;
a fourth line memory for delaying by one line the frame or field delay signal read out from the memory;
a second subtracter for calculating a difference between the signal from the third line memory and the signal from the fourth line memory;
a first multiplier for multiplying the output of the second subtracter by an arbitrary gain;
a second multiplier for multiplying the result of the first multiplier by the motion coefficient outputted from the motion detection apparatus; and
an adder/subtracter for adding/subtracting the output of the second multiplier to or from the signal of the fifth third line memory in accordance with a sign of the subtraction result by the second subtracter;
wherein the video output signal of the adder/subtracter is inputted to the frame memory, and the frame memory outputs a delay signal of (1 field-1 line) or (1 frame-1 line).

13. The noise reduction apparatus as defined in claim 12, further comprising a selector for switching a plurality gains for each pixel in horizontal and vertical directions and in a frame or field direction,
wherein the first multiplier multiplies the gain from the selector by the output of the second subtracter.

14. A noise reduction apparatus as defined in claim 12, further comprising a level adjustment portion for continuously adjusting an absolute value of the output signal of the second subtracter to a value smaller than an original value when the absolute value of the second subtracter is below a predetermined level, and outputting the absolute value to the first multiplier.

15. A noise reduction apparatus as defined in claim 14, further comprising:
- a mean value circuit for calculating the sum of corresponding pixels inside the block in the video input signal and a signal of the third line memory and calculating a mean signal level; and
- a gain adjustment portion for adjusting the gain to be multiplied by the first multiplier in accordance with a value of the mean value circuit.

16. A noise reduction apparatus as defined in claim 15, further comprising:
- a filter processing portion for executing a low-pass filter processing in a spatial direction for an output of the noise reduction apparatus;
- a blending coefficient calculation portion for deciding a ratio of blending of an output of the filter processing portion and an output signal of the noise reduction apparatus in accordance with a value of a continuous motion coefficient obtained from the motion detection apparatus;
- a blending processing portion for blending the output of the filter processing portion and the output signal of the noise reduction apparatus at a blending coefficient decided by the blending coefficient calculation portion;
- a contour detection portion for extracting a contour portion of an image by the output signal of the noise reduction apparatus; and
- a second selector for switching the output of the blending processing portion and the output signal from the noise reduction apparatus by the output from the contour detection portion,
- wherein the signal selected by the second selector is inputted to the memory.

17. The noise reduction apparatus as defined in claim 12:
said motion detection apparatus further comprising:
a peculiar point removal portion for removing a peculiar point occurring in the processing of the block discrimination portion in the block unit and outputting a motion detection result signal by:
applying in escalation the result of the block discrimination portion to a plurality of pixels in the horizontal or vertical direction; or
applying in escalation the result in a direction of a time axis; or
comparing the result with a signal before processing in the block discrimination portion in each pixel.

18. The noise reduction apparatus as defined in claim 17, further comprising a selector for switching a plurality gains for each pixel in horizontal and vertical directions and in a frame or field direction,
- wherein the first multiplier multiplies the gain from the selector by the output of the second subtracter.

19. A noise reduction apparatus as defined in claim 17, further comprising a level adjustment portion for continuously adjusting an absolute value of the output signal of the second subtracter to a value smaller than an original value when the absolute value of the second subtracter is below a predetermined level, and outputting the absolute value to the first multiplier.

20. A noise reduction apparatus as defined in claim 19, further comprising:
- a mean value circuit for calculating the sum of corresponding pixels inside the block in the video input signal and a signal of the fifth third line memory and calculating a mean signal level; and
- a gain adjustment portion for adjusting the gain to be multiplied by the first multiplier in accordance with a value of the mean value circuit.

21. A noise reduction apparatus as defined in claim 20, further comprising:
- a filter processing portion for executing a low-pass filter processing in a spatial direction for an output of the noise reduction apparatus;
- a blending coefficient calculation portion for deciding a ratio of blending of an output of the filter processing portion and an output signal of the noise reduction apparatus in accordance with a value of a continuous motion coefficient obtained from the motion detection apparatus;
- a blending processing portion for blending the output of the filter processing portion and the output signal of the noise reduction apparatus at a blending coefficient decided by the blending coefficient calculation portion;
- a contour detection portion for extracting a contour portion of an image by the output signal of the noise reduction apparatus; and
- a second selector for switching the output of the blending processing portion and the output signal from the noise reduction apparatus by the output from the contour detection portion,
- wherein the signal selected by the second selector is inputted to the memory.

* * * * *

UNITED STATES PATENT AND TRADEMARK OFFICE
CERTIFICATE OF CORRECTION

| | |
|---|---|
| PATENT NO. | : 7,903,179 B2 |
| APPLICATION NO. | : 10/510872 |
| DATED | : March 8, 2011 |
| INVENTOR(S) | : Hideki Morino |

It is certified that error appears in the above-identified patent and that said Letters Patent is hereby corrected as shown below:

At Column 24, line 51, "signal of the fifth third" should read --signal of the third--

At Column 26, line 18, "a signal of the fifth third" should read --a signal of the third--

Signed and Sealed this
Twenty-fourth Day of May, 2011

David J. Kappos
*Director of the United States Patent and Trademark Office*